United States Patent Office 3,341,557
Patented Sept. 12, 1967

3,341,557
7-METHYLTESTOSTERONES
John C. Babcock, Kalamazoo, and J Allan Campbell, Kalamazoo Township, Kalamazoo County, Mich., assignors to The Upjohn Company, Kalamazoo, Mich., a corporation of Delaware
No Drawing. Filed June 5, 1961, Ser. No. 114,621
8 Claims. (Cl. 260—397.3)

The present invention relates to certain novel steroid compounds, more particularly to certain 7-methyltestosterones and the corresponding $\Delta^1$-derivatives thereof, to certain 7-methyl-19-nortestosterones, and to processes for the production of the aforesaid compounds.

This application is a continuation-in-part of application Ser. No. 740,194, filed June 6, 1958, now abandoned, and application Ser. No. 69,557, filed Nov. 6, 1960, now abandoned.

The 7-methyltestosterones and the corresponding $\Delta^1$-derivatives thereof, which compounds form part of the present invention, and processes for the production thereof, are illustratively represented by the following formulae in Reaction Scheme A wherein the dotted line between carbon atoms 1 and 2 indicates that these atoms can be joined by a single or double bond, R is a 17-substituent selected from the group consisting of β-hydroxy, β-hydroxy-17α-methyl, β-acyloxy-17α-methyl and β-acyloxy, R' is an 11-substituent selected from the group consisting of hydroxy (α and β), α-acyloxy, hydrogen, a 9(11)-double bond, and keto, the acyl radical of the acyloxy group in each instance being that of an organic carboxylic acid, preferably a hydrocarbon carboxylic and containing from one to twelve carbon atoms, inclusive, X is a halogen of atomic weight 35 to 127, inclusive, and X' is a halogen of atomic weight 19 to 127, inclusive. In the following formulae, the 7-methyl group represents both the alpha and beta stereoisomers and the mixture thereof.

The process of the instant invention as set forth in Reaction Scheme A below comprises: treating a 6-dehydrotestosterone (I) with a methyl Grignard reagent in the presence of a 1,6-addition-promoting agent, e.g., cuprous chloride, to produce a 7-methyltestosterone (II, III). The corresponding 1-dehydro-7-methyltestosterones [IIa and III (1,2-unsaturated)] can be prepared from the 7-methyltestosterones (II) or (III: 1,2-saturated) by methods well-known in the art, for example, by treatment with selenium dioxide using the procedure described by Meystre et al., Helv. Chim. Acta. 39, 734 (1956), or by treatment with a 1-dehydrogenating microorganism, for example, of the genus Septomyxa, using, for example, the procedure described in U.S. Patent 2,897,218. The 7-methyltestosterones (II) and the corresponding 1-dehydro derivatives (IIa) can then be converted to other 7-methyltestosterones and 1-dehydro-7-methyltestosterones, e.g., by dehydrating 7-methyl-11β-hydroxytestosterone or 17-acylate and 7,17-dimethyl-11β-hydroxytestosterone or 17-acylate and the corresponding 1-dehydro derivatives to produce 7-methyl-9(11)-dehydrotestosterone or 17-acylate and 7,17-dimethyl-9(11)-dehydrotestosterone or 17-acylate, and the corresponding 1-dehydro derivatives respectively (III); treating 7-methyl-9(11)-dehydrotestosterone, a 17-ester thereof, 7,17-dimethyl-9(11)-dehydrotestosterone or a 17-ester thereof, or the corresponding 1-dehydro derivatives thereof with a hypohalous acid to obtain a 7-methyl-9α-halo-11β-hydroxytestosterone, 17-ester, and 7,17-dimethyl-9α-halo-11β-hydroxytestosterone or 17-ester, and the corresponding 1-dehydro derivatives thereof, respectively (IV); treating the thus-produced 7-methyl-9α-halo-11β-hydroxytestosterone, 17-ester thereof, 7,17-dimethyl-9α-halo-11β-hydroxytestosterone, or 17-ester thereof or the corresponding 1-dehydro derivatives thereof, with a weak base, e.g., potassium or sodium hydroxide in slight excess so as to produce a medium of pH 8 to 10, or potassium or sodium acetate, to obtain 7-methyl-9β,11β-epoxytestosterone, a 17-ester thereof, 7,17-dimethyl-9β,11β-epoxytestosterone, and 17-ester thereof, and the corresponding 1-dehydro derivatives thereof, respectively (V); and reacting the thus-produced 7-methyl-9β,11β-epoxytestosterone, 17-ester thereof, 7,17-dimethyl-9β,11β-epoxytestosterone, or 17-ester thereof or the corresponding 1-dehydro derivatives thereof, with hydrofluoric acid to obtain 7-methyl-9α-fluoro-11β-hydroxytestosterone, 17-ester thereof, 7,17-dimethyl-9α-fluoro-11β-hydroxytestosterone, and 17-ester thereof, and the corresponding 1-dehydro derivatives thereof respectively (VI). After each of the above steps, the 17-ester group, when present, can be hydrolyzed

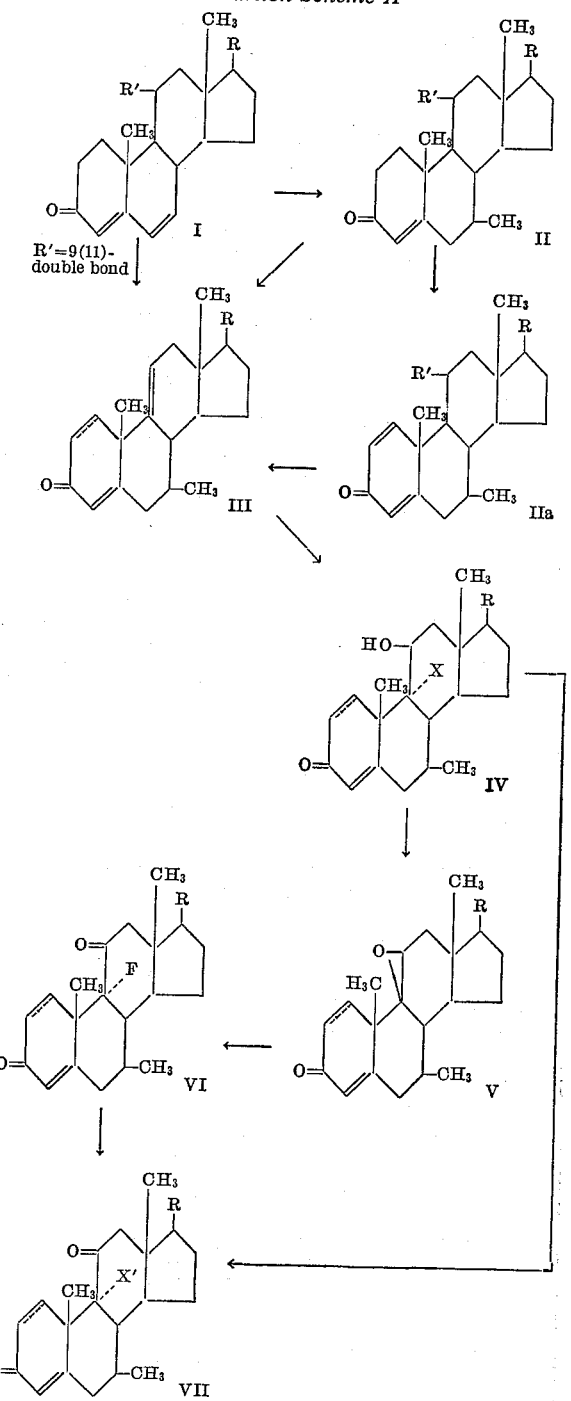

Reaction Scheme A with acid in the case of IV or with base, if desired, to produce the corresponding free 17-hydroxy compound. Oxidation of a 7-methyl-9α-halo-11β-hydroxytestosterone or the 1-dehydro derivative thereof (IV or VI) with chromic acid produces the corresponding 7-methyl-9α-halo-11-ketotestosterone and 1-dehydro derivative thereof (VII). The 17-acylate group, when present, can be hydrolyzed with alkali-metal base to produce the corresponding 7-methyl-9α-halo-11-ketotestosterone or 1-dehydro derivative thereof. 7-methyl-9α-halo-11-ketotestosterone 17-acylates or 1-dehydro derivatives thereof can also be hydrolyzed in alcoholic acid solutions to give the corresponding 7-methyl-9α-halo-11-ketotestosterone or 1-dehydro derivative thereof.

A 17-acylate group can be introduced into any of the above compounds having a 17-hydroxy group, by techniques well known in the art. If there is also present a 17-methyl group, more vigorous esterification techniques are required, as is known in the art.

The 7-methyl-19-nortestosterones, which form part of the present invention, and processes for the production thereof, are illustratively represented by the following formulae in Reaction Scheme B:

Reaction Scheme B

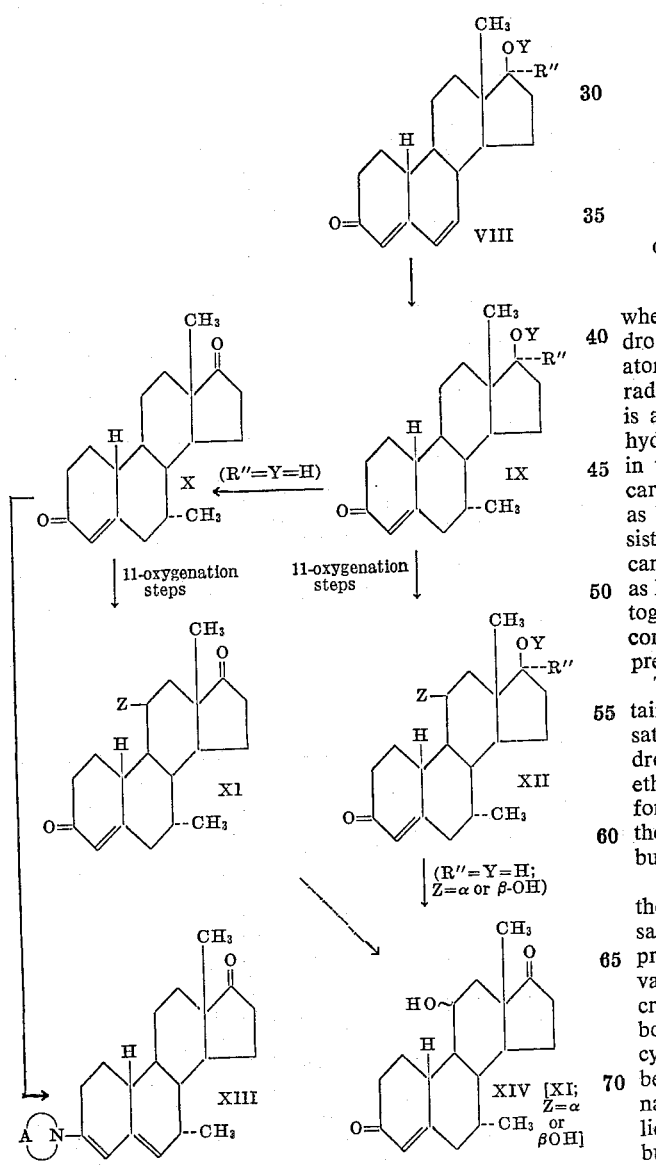

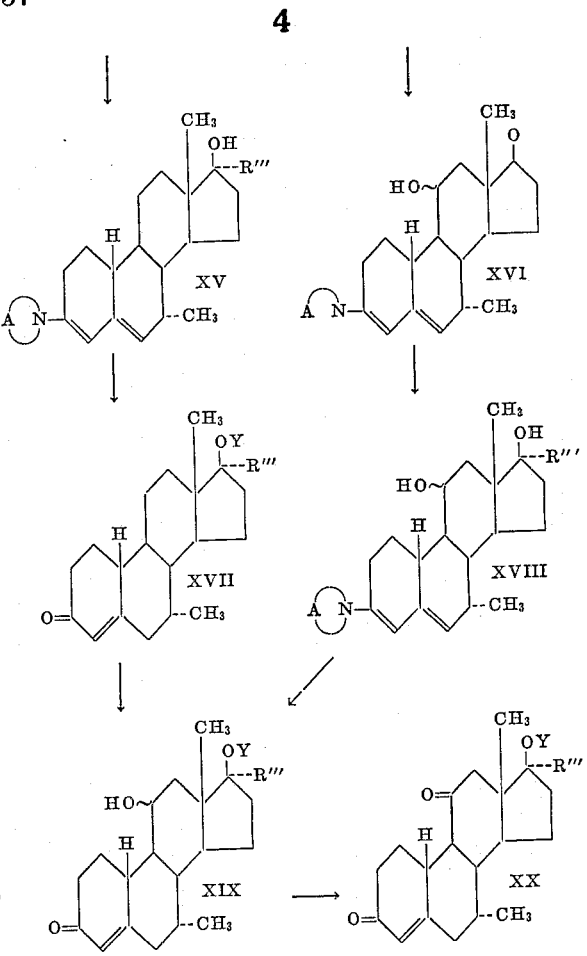

wherein R″ is selected from the class consisting of hydrogen and lower-alkyl containing from 1 to 4 carbon atoms, inclusive, R‴ is a lower aliphatic hydrocarbon radical containing from 1 to 4 carbon atoms, inclusive, Z is an 11-substituent selected from the class consisting of hydrogen, keto, hydroxy (α and β), and α-acyloxy, wherein the acyl of the acyloxy radical is that of an organic carboxylic acid preferably a hydrocarbon carboxylic acid as hereinbefore defined, Y is selected from the class consisting of hydrogen and the acyl radical of an organic carboxylic acid, preferably a hydrocarbon carboxylic acid as hereinbefore defined, and A is an alkylene group which, together with the attached nitrogen atom, forms a ring containing from 5 to 6 members, inclusive, and which preferably contains less than 9 carbon atoms.

The term "lower aliphatic hydrocarbon radical containing from 1 to 4 carbon atoms, inclusive" means a saturated or unsaturated 1 to 4 carbon atom aliphatic hydrocarbon radical such as alkyl, for example, methyl, ethyl, propyl, butyl, and isomeric forms thereof, alkenyl, for example, vinyl, propenyl, butenyl and isomeric forms thereof, and alkynyl, for example, ethynyl, propynyl, butynyl, and isomeric forms thereof.

The organic carboxylic acids, from which the acylates of the present invention are derived, include saturated and unsaturated aliphatic acids and aromatic acids such as acetic, propionic, butyric, isobutyric, tert-butylacetic, valeric, isovaleric, caproic, caprylic, decanoic, dodecanoic, acrylic, crotonic, hexynoic, heptynoic, actynoic, cyclobutanecarboxylic, cyclopentanecarboxylic, cyclopentenecarboxylic, cyclohexanecarboxylic, dimethylcyclohexanecarboxylic, benzoic, toluic, naphthoic, ethylbenzoic, phenylacetic, naphthaleneacetic, phenylvaleric, cinnamic, phenylpropiolic, phenylpropionic, p-hexyloxyphenylpropionic acid, p-butyloxyphenylpropionic acid, and like p-alkoxyphenylalkanoic acids.

The process of the invention as set forth in Reaction

Scheme B above comprises: treating a 6-heydro-9-nortestosterone (VIII) with a methyl Grignard reagent in the presence of a 1,6-addition-promoting agent, for example, cuprous chloride, to produce a 7α-methyl-9-nortestosterone (IX). The 7α-methyl-9-nortestosterone (IX) so produced can then be converted to other 7α-methyl-19-nortestosterones. For example, the compound (IX) can be hydroxylated in the 11-position, illustratively by treatment with an 11α-hydroxylating microorganism using the procedures described in U.S. Patents 2,602,769, 2,649,400, 2,649,401, and 2,649,402 to yield the corresponding 11α-hydroxy compound (XII; Z=α-OH), or by treatment with an 11β-hydroxylating microorganism using procedures such as that described in U.S. Patent 2,602,769 to yield the corresponding 11β-hydroxy compound (XII; Z=β-hydrxoy). The 11-hydroxy compounds so obtained can be oxidized, for example, using chromic acid, sodium dichromate, potassium dichromate and the like, to yield the corresponding 11-keto compounds (XII; Z=keto). In the case where R″ and Y=H in the 11-hydroxy compound (XII; Z=α or β-OH) such oxidation will also result in oxidation at the 17-position to give the corresponding 11, 17-diketo compound.

The compound (IX; R″=Y=H) can also be oxidized, for example, with chromic acid or like oxidizing agents using procedures known in the art, to obtain the corresponding 17-keto compound (X). Compound (X) so obtained can be converted to the corresponding 11α- or 11β-hydroxy compounds (XI; Z=α or β-OH) using the procedures described above, and the resulting 11-hydroxy compounds can be oxidized to the corresponding 11-keto compound (XI; Z=keto) using the oxidation procedures described above.

The compound (X) can also be converted to the 3-enamine (XIII), the 3-enamine (XIII) treated with an appropriate alkylating agent such as the appropriate Grignard reagent, alkyl or alkenyl lithium compound or alkali metal alkyne derivative to obtain the compound XV, and the latter compound hydrolyzed using neutral, acidic or alkaline aqueous reaction conditions, to the corresponding 17-alkylated-7-methyl-19-nortestosterone (XVII; Y=H). The 17-hydroxy group in the compound (XVII; Y=H) so obtained can be acylated, if desired, using acylating conditions known in the art, to yield the corresponding 17-acyloxy compound (XVII; Y=Ac). The compound (XVII; Y=H or Ac) can then be subjected to 11-hydroxylation using the procedures described above to obtain the corresponding 11α- and 11β-hydroxy compounds (XIX; Y=H) which can then be converted to the corresponding 11α,17-diacyloxy compounds or 11β-hydroxy-17-acyloxy compounds by acylation using procedures well-known in the art. The 11-hydroxy compounds (XIX) can also be oxidized to the corresponding 11-keto compounds (XX) using oxidation procedures such as those described above.

In an alternative synthesis of the compounds (XIX), the compounds (XIV) obtained by Oppenauer oxidation of the compound (XII; R″=Y=H, Z=α- or β-OH) or the compound (XI; Z=α or β-OH) is converted to the corresponding 3-enamine (XVI) and the latter is treated with an alkylating agent such as those described above to obtain the 3-enamine of the corresponding 17-alkylated-11-hydroxy-7α-methyl-19-nortestosterone (XVIII). The latter compound is then hydrolyzed using the conditions hereinbefore described to obtain the compound (XIX; Y=H).

It is an object of this invention to provide 7-methyl-testosterones and the corresponding 1-dehydro derivatives (II–VII) and a process for their production. It is a particular object of this invention to provide 7-methyl-testosterone,
1-dehydro-7-methyltestosterone,
7-methyl-11β-hydroxytestosterone,
1-dehydro-7-methyl-11β-hydroxytestosterone,
7,17-dimethyltestosterone,
1-dehydro-7,17-dimethyltestosterone,
7,17-dimethyl-11β-hydroxytestosterone,
1-dehydro-7,17-dimethyl-11β-hydroxytestosterone,
7-methyl-9α-fluoro-11β-hydroxytestosterone,
1-dehydro-7-methyl-9α-fluoro-11β-hydroxytestosterone,
7,17-dimethyl-9α-fluoro-11β-hydroxytestosterone, and
1-dehydro-7,17-dimethyl-9α-fluoro-11β-hydroxytestosterone, and the 17-esters thereof, especially those of hydrocarbon carboxylic acids containing from one to twelve carbon atoms, inclusive.

It is a further object of this invention to provide 7-methyl-19-nortestosterones (IX, X, XI, XII, XIV, XVII, XIX and XX) and a process for their production. It is a particular object of this invention to provide 7-methyl-19-nortestosterone and the 17-esters thereof, 7-methyl-19-nor-Δ⁴-androstene-3,17-dione, 7-methyl-17-ethynyl-19-nortestosterone and the 17-esters thereof, 17-ethyl-7-methyl-19-nortestosterone and the 17-esters thereof, and 7,17-dimethyl-19-nortestosterone and the 17-esters thereof.

The 7-methyltestosterones and the 1-dehydro-7-methyltestosterones of the present invention (II, IIA–VII) have androgenic and anabolic activity of improved therapeutic ratio. Compounds II, IIA, and VI, wherein R′ is hydrogen and R is β-hydroxy, β-acyloxy or β-hydroxy-α-methyl, are particularly valuable in this respect. The compounds (II, IIA–VII) also possesses antiestrogenic, gonadotropin inhibiting activity, progestational, growth-promoting, and central nervous system regulating activities making them of value in medical and veterinary practice.

The 7-methyl-19-nortestosterones of the present invention (IX, X, XI, XII, XIV, XVII, XIX and XX) possess anabolic and androgenic activity with an improved potency and improved therapeutic ratio of anabolic to androgenic activity. They also possess antiestrogenic, gonadotropin inhibiting, progestational, growth-promoting, antifertility and central nervous system depressant activity. The compound 7α-methyl-17α-ethinyl-19-nortestosterone is of particular interest since it possess greater activity as an antifertility agent but lower activity as a progestational agent than the closely related known compound 17α-ethinyl-19-nortestosterone.

In addition, the 7α-methyl-19-nortestosterones (IX–XX) of the invention are intermediates in the preparation of the corresponding 7α-methylestrones and 7α-methylestradiols which latter compounds possess activity as gonadotropin inhibitors, antifertility agents, and blood cholesterol lowering agents of improved therapeutic ratio. Thus the 7α-methyl-19-nortestosterones of the invention can be dehydrogenated, for example, using *Septomyxa affinis* and like dehydrogenating microorganisms, to yield the corresponding 7α-methylestrones and 7α-methylestradiols.

The compounds of this invention can be prepared and administered to mammals, birds, humans, and animals, in a wide variety of oral or parenteral dosage forms singly, or in admixture with other coacting compounds. They can be administered with a pharmaceutical carrier which can be a solid material or a liquid in which the compound is dissolved, dispersed or suspended. The solid compositions can take the form of tablets, powders, capsules, pills, or the like, preferably in unit dosage forms for simple administration or precise dosages. The liquid compositions can take the form of solutions, emulsions, suspensions, syrups or elixirs. The oral forms are preferably used for the 17α-alkylated 17β-hydroxy compounds of this invention which possess particularly advantageous oral activity.

In carrying out the process of the present invention illustrated in Reaction Scheme A, the starting 6-dehydrotestosterone (I) is reacted with an excess of a methyl Grignard reagent, e.g., methyl magnesium iodide or methyl magnesium bromide, in the presence of cuprous chloride or equivalent catalyst. See "Grignard Reaction," Kharasch and Reinmuth, Prentice Hall, Inc. Publishers (1954), page 219, for a discussion of other catalysts. Cuprous chloride is preferred. Various inert solvents can be employed, e.g., benzene, toluene, the dimethyl ether of ethylene glycol, ether, tetrahydrofuran, or a mixture of these. The reaction temperature can vary between minus 40 degrees centigrade and the boiling point of the reaction mixture. A temperature between about sixty degrees centigrade and zero degrees centigrade is preferred. As the 17-oxygen function, and to a certain extent the 11-hydroxy group will also react with the Grignard reagent, more than one molar equivalent of the Grignard reagent should be employed to ensure complete reaction with the 3-keto-$\Delta^{4,6}$-diene system. A ratio of at least five moles of Grignard per mole of steroid is preferred. Methyl magnesium bromide produces the highest yield of desired product and is the preferred reagent.

The 7-methyltestosterones (II) so obtained can then, if desired, be converted to the corresponding 1-dehydro-7-methyltestosterones (IIa) by the procedures hereinbefore described. The 1-dehydro compounds (IIa) so obtained can be purified by procedures known in the art, for example, by recrystallization or by chromatography. Where the crude 1-dehydro compound (IIa) contains an appreciable amount of the unconverted starting material (II) the mixture can be separated by conversion of the latter to the corresponding 3-enamine. For example, refluxing the mixture of (II) and (IIa) in benzene in the presence of a secondary cyclic alkylene amine such as pyrrolidine for several hours converts the compound (II) to its 3-enamine whereas the compound (IIa) does not form an enamine under such conditions. The mixture of the compound (IIa) and the 3-enamine of (II) can then be separated by treatment with dilute mineral acid when the 3-enamine dissolves and the compound (IIa) can be recovered and purified further, if necessary, for example by recrystallization.

In the next step of the process of Reaction Scheme A, a 7-methyl-11-hydroxytestosterone or the corresponding 1-dehydro compound (II or IIa, R'=OH) is dehydrated by the process shown in the example, or by prior art procedure for dehydration of 11α- and 11β-hydroxy steroids, e.g., [Fieser and Fieser, "Natural Products Related to Phenanthrene," Reinhold Publishing Corporation, New York, 1949, pages 408–409], to produce the corresponding 7-methyl-9(11)-dehydrotestosterone or 1-dehydro-7-methyl-9(11)-dehydrotestosterone (III). The compound (III) dissolved in a suitable solvent such as, for example, methylene chloride, tertiary butyl alcohol, dioxane, tertiary amyl alcohol, acetone, or the like, is reacted with a hypohalous acid, i.e., hypochlorous, hypobromous or hypoiodous acid to produce the corresponding 7-methyl-9α-halo-11β-hydroxytestosterone or 1-dehydro-7-methyl-9α-halo-11β-hydroxytestosterone (IV).

Instead of using the free acid it is usually more convenient to produce the hypohalous acid in situ by reacting an N-haloamide or an N-haloimide with a mineral acid. N-haloamides or an N-haloimides useful in this procedure include N-chloroacetamide, N-bromoacetamide, N-chlorosuccinimide, N-bromosuccinimide, N-iodosuccinimide, and the like. The mineral acid used to liberate the hypohalous acid is usually dilute perchloric or dilute sulfuric acid. The reaction is generally carried out at temperatures between zero and thirty degrees centigrade, however, lower or higher temperatures are operative for the process. The hypohalous acid releasing agent is generally used in equimolar proportion or in slight excess, e.g., a 25 percent excess. A large excess of the hypohalous acid-releasing agent, while operative, is undesirable since the excess of hypohalous acid has a tendency to react with other positions of the molecule. The reaction period is rather short and may vary between about four to five minutes to one hour. At the end of the reaction time excess hypohalous acid is destroyed by the addition of sodium sulfite or other sulfites or hydrosulfites. The thus-produced product, a 7-methyl-9α-halo-11β-hydroxytestosterone or the 1-dehydro derivative thereof (IV), is isolated from the reaction mixture by adding an excess of water and extracting the reaction mixture with organic solvents such as methylene chloride, chloroform, benzene, toluene, ether, ethyl acetate, hexane hydrocarbons (Skellysolve B), or the like, or by filtration. The crude product thus obtained is purified by conventional procedures such as recrystallization or chromatography, as deemed necessary.

7-methyl-9β,11β-epoxytestosterones and the corresponding 1-dehydro compounds (V) are prepared by treating the appropriately substituted compound (IV) with a mild base. In this reaction the compound (IV) is dissolved in an organic solvent such as, for example, methanol, ethanol, isopropanol, dioxane, tertiary butyl alcohol, or tetrahydrofuran, and treated with a base, e.g., potassium acetate, sodium bicarbonate, or a sodium acylate, e.g., sodium acetate. If the starting material is a 17-ester of a compound (IV) sodium or potassium acetate is preferred in order to avoid simultaneous hydrolysis of such ester. Heating of the reaction mixture is preferred and the reaction time is usually between three and twelve hours. Alternatively a methanolic solution of compound (IV) is stirred at room temperature with aqueous base such as sodium hydroxide, potassium hydroxide, barium hydroxide, or the like. The base is added slowly with continuous agitation and carried only to the point at which the reaction mixture remains basic to phenolphthalein for a period of about one-half minute. The thus-obtained 7-methyl-9β,11β-epoxytestosterone or 1-dehydro-7-methyl-9β,11β-epoxytestosterone (V) is separated from the reaction mixture by conventional means such as adding an excess of water to the reaction mixture and either filtering the thus-produced precipitate or extracting with water-immiscible solvent, e.g., ether, hexanes (Skellysolve B), pentanes, benzene, ether, ethyl acetate, chloroform, methylene chloride, carbon tetrachloride, or the like. Purification of the thus obtained compound (V) may be by conventional means such as recrystallization or chromatography.

7-methyl-9β,11β-epoxytestosterones and the corresponding 1-dehydro compounds (V) are converted to 7-methyl-9α-fluoro-11β-hydroxytestosterones and the corresponding 1-dehydro compounds (VI) by reaction with 48 percent aqueous hydrofluoric acid solution in a solvent. As solvents for this reaction, methylene chloride, ethylene dichloride, chloroform, carbon tetrachloride, or the like, are used with methylene chloride and chloroform preferred. The reaction in the preferred embodiment is carried out in the presence of acid catalysts such as perchloric acid, toluenesulfonic acid, sulfuric acid, or the like. The reaction temperature is preferably from twenty to thirty degrees centigrade. The period of reaction is from one to 24 hours. Instead of aqueous hydrofluoric acid, hydrogen fluoride gas, dissolved in a chilled solution of alcohol-free chloroform or methylene chloride, preferably containing tetrahydrofuran, can be used. In this case, a chilled solution of compound (V) in a convenient solvent such as chloroform, methylene chloride, carbon tetrachloride, or the like, contained in a polyethylene bottle, is admixed with a chilled solution of gaseous hydrogen fluoride in chloroform, methylene chloride, or carbon tetrachloride solution. The stoppered bottle is than allowed to stand for a period of between one hour and 24 hours at low temperatures, e.g., between minus forty and plus ten degrees centigrade, with temperatures between zero and minus 25 degrees centigrade preferred. After the reaction is terminated, the reaction mixture obtained by either of the two methods is neutralized with an aqueous base such as aqueous sodium bicarbonate, aqueous sodium carbonate, potassium carbonate or bicarbonate, or dilute sodium or potassium hydroxide, or the like, and the thus-obtained 7-methyl-9α-fluoro-11β-hydroxytestosterone, or ester thereof, or the corresponding 1-dehydro compound, is separated from the reaction mixture by conventional means such as extraction with water-immiscible organic solvents, for example, ether, ethyl acetate, hexanes (Skellysolve B), chloroform, carbon tetrachloride, methylene chloride, or the like. Evaporation of the extraction solvent gives the crude compound (VI) which can be purified by conventional means, e.g., recrystallization or chromatography.

In order to obtain 7-methyl-9α-halo-11-ketotestosterones or the corresponding 1-dehydro compounds (VII), any one of the before-mentioned 7-methyl-9α-halo-11β-hydroxytestosterone 17-esters or corresponding 1-dehydro compounds (IV, VI, R=acyloxy) or 7-17-dimethyl-9α-halo-11β-hydroxytestosterone or corresponding 1-dehydro compounds (IV, VI, R=β-hydroxy-α-methyl) is oxidized preferably by chromic acid in an acidic solvent, e.g., acetic acid, acetic acid plus benzene, dilute mineral acid plus methylene chloride, or the like.

Hydrolyzing a 7-methyltestosterone 17-acylate or corresponding 1-dehydro compound (II–VII, R=acyloxy) with an alkali metal base in aqueous alcoholic solution or dilute mineral acid produces the corresponding 7-methyltestosterone or 1-dehydro compound as the free 17-alcohol.

The pure 7-stereoisomers, each free from the other, can be obtained by fractional crystallization or carbon chromatography to obtain one of the isomers and then treatment of the residual mixture of isomers with chloranil which reacts with only the 7β-isomer leaving the 7α-isomer unchanged, and then separating that isomer from the resulting 6-dehydro compound as shown in Example 2. The 6-dehydro-7-methyl compound resulting from the chloranil reaction can be converted back to the 7β-methyl compound by selective hydrogenation using, for example, a palladium-on-charcoal catalyst as disclosed by Shepherd et al., J. Am. Chem. Soc. 77, 1212, 1955.

Any of the compounds III, V, VI, wherein the 1,2-bond is unsaturated can be prepared from the corresponding compound in which the 1,2-bond is saturated by 1-dehydrogenation using the procedures described above.

The 6-dehydrotestosterones employed as starting materials in Reaction Scheme A are prepared as described in U.S. 2,739,974 or by the reaction of testosterone with chloranil as shown in Example 2, or by reacting a 3β-hydroxy-5-androstene, having R' in the 11-position and R in the 17-position, R and R' being defined as hereinabove, with aluminum tertiary butoxide and para-quinone in the manner described in Preparation 2. The starting 3β-hydroxy-5-androstenes can be prepared by the sodium borohydride reduction of a 3-enol ester of a testosterone in the manner described in Preparation 1.

In carrying out the process of the present invention as illustrated in Reaction Scheme B, the starting 6-dehydro-19-nortestosterone (VIII) is reacted with an excess of a methyl Grignard reagent, for example, methyl magnesium iodide, methyl magnesium bromide, and the like, in the presence of cuprous chloride or equivalent catalyst; see "Grignard Reaction," supra. Cuprous chloride is preferred. Various inert solvents can be employed, for example, benzene, toluene, ethylene glycol dimethyl ether, ether, tetrahydrofuran, and the like, or a mixture of any two of these solvents. The reaction temperature can vary between minus 40° C. and the boiling point of the reaction mixture. A temperature between about 0° C. and 60° C. is preferred. The Grignard reagent is preferably employed in the ratio of at least 5 moles of Grignard per mole of steroid. Methyl magnesium bromide produces the highest yield of desired product and is the preferred reagent.

Where the group Y is hydrogen in the compound (IX) so obtained said compound can be acylated to produce the corresponding 17-acyloxy compound (IX; Y=Ac). The acylation can be accomplished using methods known in the art, for example, by treatment with the appropriate acid anhydride or acid halide in the presence of a tertiary base such as pyridine.

The 7α-methyl-19-nortestosterone (IX) can be subjected to 11-hydroxylation as follows. The compound (IX) can be subjected to the action of the enzymes of an 11α-hydroxylating microorganism such as those of the genera Mucorales, Aspergillus, Penicillium, and Streptomyces using, for example, the procedures described in U.S. Patents 2,602,769, 2,649,400, 2,649,401, and 2,649,402. There is thus obtained the compound (XII) wherein Z=α-hydroxy and Y=hydrogen. Alternatively the compound (IX) can be subjected to the action of the enzymes of an 11β-hydroxylating microorganism such as *Cunninghamella blakesleeana*, *Curvularia lunata*, *Trichothecium roseum*, and the like using procedures well known in the art, for example, that described in Example 2 of U.S. Patent 2,602,769. There is thus obtained the compound XII wherein Z=β-hydroxy and Y=hydrogen.

Where the group Y is acyl in the compound (IX) said group will generally be removed during the microbiological hydroxylation procedures and in order to obtain the compound (XII) wherein Y is acyl it is necessary to acylate the free 17-hydroxy group using procedures such as those described above. Such acylation will also convert the 11α-hydroxy, when present, to the corresponding 11α-acyloxy group.

In order to obtain the compound (XII) wherein Z is keto, the corresponding 11α or β-hydroxy compound (XII; Z=α or β-OH and Y=Ac when R" is hydrogen) is oxidized using procedures known in the art. For example, the oxidation can be effected using chromic acid, sodium dichromate, potassium dichromate and like oxidizing agents.

The compound (IX) wherein Y and R" both represent hydrogen, i.e., 7α-methyl-19-nortestosterone, can be oxidized to the compound (X), i.e., 7α-methyl-19-nor-Δ4-androstene-3,17-dione, using procedures known in the art, for example, using chromic acid, sodium dichromate, potassium dichromate and like oxidizing agents.

The 7α-methyl-19-nor-Δ4-androstene-3,17-dione (X) so obtained can then be converted to the corresponding 11α-hydroxy, 11β-hydroxy, and 11-keto compound (XI) using the procedures described above for the 11-hydroxylation of compound (IX) and the oxidation of the 11-hydroxy compounds to 11-keto.

The compound (X) can also be converted to the compounds (XVII), (XIX) and (XX) of the invention using the following procedure. The 7α-methyl-19-nor-Δ4-androstene-3,17-dione (X) is first converted to the corresponding 3-enamine, for example, by reaction with a secondary cyclic alkylene amine

wherein A has the significance hereinbefore defined, if desired in the presence of an acid catalyst.

The secondary cyclic alkylene amines which can be used in the above reaction include pyrrolidine, piperidine, and C-alkyl substituted pyrrolidines, and piperidines such as 2,4-dimethylpyrrolidine, 3-propylpiperidine, 2-methylpyrrolidine, 3,4-dimethylpyrrolidine, 3-ethylpyrrolidine, 3-isopropylpyrrolidine, 3,3-dimethylpyrrolidine, and other lower alkyl C-substituted pyrrolidines, and piperidines. Pyrrolidine is the preferred amine for use in the above reaction. Advantageously, the amine is employed in excess of the required molar proportion. The reaction between the compound (X) and the amine is effected in a convenient manner by heating the reactants together in the presence of a suitable solvent, for example, a lower alkanol such as methanol, ethanol, and the like. The desired 3-enamine (XIII) generally separates from the reaction mixture after concentrating the latter and allowing to cool.

The 3-enamine (XIII) so obtained is then converted to the 3-enamine of the corresponding 17-alkylated compound (XV) by reaction with the appropriate alkylating agent. For example, the 3-enamine (XIII) can be reacted with the appropriate alkyl, alkenyl, or alkynyl magnesium halide in the presence of a solvent such as dimethyl ether, tetrahydrofuran, benzene and the like, to produce the corresponding compound (XV) wherein R''' is alkyl, alkenyl, or alkynyl as hereinbefore defined. Preferably, the Grignard reagent is employed in an excess of the order of 10 moles per mole of enamine (XIII). The resulting 17-alkylated 3-enamine (XV) is generally not isolated from the reaction mixture but is hydrolyzed in situ to the corresponding 7α-methyl-17-alkylated-19-nortestosterone (XVII) by treatment with an aqueous solution of a base such as sodium hydroxide, potassium hydroxide, and the like after first decomposing the reaction mixture with water, ammonium chloride, and the like.

Alternatively, the alkylating agent employed to convert the enamine (XIII) to the 17-alkylated compound (XV) in the case where R''' is alkyl or alkenyl, can be the appropriate alkyl or alkenyl lithium compound. The reaction is conducted advantageously in the presence of an inert solvent such as ether, benzene, toluene, and the like. The lithium compound is employed advantageously in excess of the stoichiometric proportion and is employed preferably in an amount of at least 1.5 moles per mole of compound (XIII). The reaction is ordinarily conducted at room temperature but may also be conducted at elevated temperatures up to the boiling point of the solvent employed. The 17-alkylated-3-enamine (XV) so formed is generally not isolated but is hydrolyzed in situ to the corresponding 3-keto compound (XVII) as hereinbefore described.

The compounds having the Formula XVII wherein R''' represents a 2 to 4 carbon atom alkynyl group can also be prepared by reacting the enamine (XIII) with an alkali metal derivative, for example, the sodium or potassium derivative of the corresponding alkyne. The reaction is carried out preferably in the presence of an inert solvent such as dimethylformamide or dimethylsulfoxide. The 17-alkynyl-3-enamine (XV) so obtained is not generally isolated from the reaction mixture but is hydrolyzed in situ as described above to obtain the desired compound (XVII).

The compound (XVII) where R''' represents alkynyl or alkenyl can be hydrogenated in the presence of a suitable hydrogenation catalyst such as palladium-on-charcoal to obtain the corresponding compounds in which R''' is a 2 to 4 carbon atom alkyl group.

The 7α-methyl-17-alkylated-19-nortestosterones (XVII; Y=H) so obtained can be acylated using the procedures hereinbefore described to obtain the corresponding 17-acyloxy compounds (XVII; Y=Ac).

The compounds (XVII) can be converted to the corresponding 11α-hydroxy and 11β-hydroxy compounds (XIX) using the microbiological oxidation procedures hereinbefore described, and the 11β-hydroxylated compounds (XIX) can be oxidized to the corresponding 11-keto compounds (XX) using the oxidation procedures hereinbefore described. The microbiological hydroxylations will generally result in the removal of the 17-acyl group if this is present in the starting compound (XVII). The free 17-hydroxy group in the resulting compound (XIX; Y=H) can be reacylated if desired using the procedures described above.

The compound (XIX) wherein R''' represents alkynyl or alkenyl can be hydrogenated in the presence of a suitable hydrogenation catalyst such as palladium-on-charcoal to obtain the corresponding compounds in which R''' is a 2 to 4 carbon atom alkyl group.

In an alternative method of preparation of the compounds XIX and XX, the compound XII, wherein R''=Y=H and Z=α- or β-OH, is subjected to an Oppenauer oxidation using procedures known in the art, for example, using aluminum tert-butoxide and acetone or cyclohexanone in the presence of an anhydrous organic solvent such as toluene, benzene, petroleum ether, dioxane, or other organic solvents or mixtures thereof. There is thus obtained 11-hydroxy-7α-methyl-19-nor-Δ4-androstenedione (XIV; identical to XI wherein Z=α- or β-hydroxy).

The compound (XIV) so obtained is then converted to the corresponding 3-enamine (XVI) using the procedure described above for the preparation of the corresponding 11-desoxy 3-enamine (XII).

The 11-hydroxy-7α-methyl-19-nor-Δ4-androstenedione 3-enamine (XVI) so obtained is alkylated using any of the alkylating agents and alkylating procedures described above for the alkylation of the corresponding 11-desoxy 3-enamine (XIII). There is thus obtained the corresponding 17-alkylated-11-hydroxy-7α-methyl-19-nortestosterone 3-enamine (XVIII) which is generally not isolated as such from the reaction mixture after alkylation but is hydrolyzed in situ to the corresponding 11-hydroxy-7α-methyl-17-alkylated-19-nortestosterone (XIX), for example, by treatment with an aqueous solution of a base such as sodium hydroxide, potassium hydroxide, and the like.

The compounds having the Formula VIII, which are employed as starting materials in the processes of Reaction Scheme B, can be prepared as follows:

The preparation of 6-dehydro-19-nortestosterone acetate (VIII; R''=H, Y=CH$_3$CO) by reaction of 19-nortestosterone with acetic anhydride and acetyl chloride in pyridine solution, followed by bromination of the resulting 3,17β-diacetoxy-19-nor-Δ$^{3,5}$-androstadiene and dehydrobromination of the 6-bromo-19-nortestosterone 17-acetate so formed, has been described in British Patent Specification 833,183. Replacing the acetic anhydride and acetyl chloride employed in the first step of the above process by the appropriate acid anhydride and acid chloride yields other 17-acylates having the formula (VIII; R''=H, Y=Ac). The corresponding 17-hydroxy compounds (VIII; R''=H, Y=H) can be prepared by deacylation of the 17-acylates using procedures well known in the art.

Replacing 19-nortestosterone by the appropriate 17-alkyl-19-nortestosterone and employing the appropriate acid anhydride and acid halide in the above-described process affords the requisite 17-alkyl-6-dehydro-19-nortestoserone 17-acylate (VIII: R''=alkyl, Y=acyl). The corresponding free 17-hydroxy compounds (VIII: R''=alkyl, Y=H) can be prepared by deacylation of the 17-acylates using procedures well known in the art, for example, using a base such as sodium hydroxide or potassium hydroxide in aqueous or aqueous alcoholic solution.

This invention also includes the compound 7α-methyl-17α-ethyltestosterone and the 17-acylates thereof. These compounds have androgenic and anabolic activity of improved therapeutic ratio and also possess antiestrogenic, gonadotropin-inhibiting activity, progestational, growth promoting, and central nervous system regulating activities which make them useful in the treatment of mammals in medical and veterinary practice.

The compound 7α-methyl-17α-ethyltestosterone can be prepared by reacting 6-dehydro-17α-ethyltestosterone (U.S. Patent 2,739,974) with a methyl Grignard reagent in the presence of a 1,6-addition-promoting agent, for example, cuprous chloride using the conditions hereinbefore described for the conversion of compound (I) to compound (II) in Reaction Scheme A.

Alternatively, 7α-methyl-17α-ethyltestosterone can be prepared from 7α-methyltestosterone by oxidizing the latter compound to 7α-methyl-Δ4-landrostene-3,17-dione using procedures known in the art, for example, using chromic acid, sodium dichromate, potassium dichromate and like oxidizing agents. The 7α-methyl-Δ4-landrostene-3,17-dione is then converted to the corresponding 3-enamine using pyrrolidine and like secondary cyclic alkylene amines, according to the procedures described above for the preparation of the 3-enamines (XIII) and (XVI). The 3-enamine of 7α-methyl-Δ4-landrostene-3,17-dione is then reacted with an ethyl Grignard reagent such as ethyl magnesium bromide, in the presence of a solvent such as dimethylether, tetrahydrofuran, benzene, and the like.

Preferably the ethyl Grignard reagent is employed in an excess of the order of 10 moles per mole of the 3-enamine. The resulting 3-enamine of 7α-methyl-17α-ethyltestosterone is generally not isolated from the reaction mixture but is hydrolyzed in situ to the corresponding 7α-methyl-17α-ethyltestosterone by treatment with an aqueous solution of a base such as sodium hydroxide, potassium hydroxide, and the like after first decomposing the reaction mixture with water, ammonium chloride, and the like.

In an alternative method of preparation the 3-enamine of 7α-methyl-Δ4-landrostene-3,17-dione is reacted with an alkali metal derivative, for example, the sodium or potassium derivative of acetylene. The reaction is carried out preferably in the presence of an inert solvent such as dimethylformamide or dimethylsulfoxide. The 3-enamine of 7α-methyl-17α-ethynyltestosterone so obtained is not generally isolated from the reaction mixture but is hydrolyzed in situ as described above to obtain 7α-methyl-17α-ethynyltestosterone. The latter compound is then hydrogenated in the presence of a suitable hydrogenation catalyst such as palladium-on-charcoal to obtain the desired 7α-methyl-17α-ethyltestosterone.

The 17-acylates of 7α-methyl-17α-ethyltestosterone can be prepared from the latter compound using procedures known in the art, for example, by treatment with the appropriate acid anhydride or acid halide in the presence of a tertiary base such as pyridine.

The compound 7α - methyl - 17α - ethynyltestosterone (which is employed as described above as an intermediate in the preparation of 7α-methyl-17α-ethyltestosterone) and the corresponding 17-acylates are compounds having androgenic and anabolic activity of improved therapeutic ratio and also possess antiestrogenic, gonadotropin-inhibiting activity, progestational, growth-promoting, and central nervous system regulating activities which make them useful in the treatment of mammals in medical and veterinary practice.

The following preparations and examples are illustrative of the process and products of the present invention, but are not to be construed as limiting.

PREPARATION 1.—17α-METHYL-5-ANDROSTENE-3β,11β,17β-TRIOL

A solution of five grams of 11β-hydroxy-17α-methyltestosterone (U.S. Patent 2,735,854), 25 milliliters of acetic anhydride, 100 milligrams of para-toluenesulfonic acid, and 100 milliliters of toluene was heated in a nitrogen atmosphere at reflux for four and one-half hours. The solvent was removed by distillation under vacuum. The residue resisted crystallization. It was dissolved in 100 milliliters of 95 percent alcohol and three milliliters of ten percent sodium hydroxide and cooled to zero degrees centigrade.

A solution of five grams of sodium borohydride and 100 milliliters of seventy percent alcohol was added with stirring and cooling. After one hour, 2.5 grams of sodium borohydride in fifty milliliters of seventy percent alcohol was added. The solution was stored three days at five degrees centigrade, then fifteen milliliters of ten percent sodium hydroxide solution was added and the solution heated to nearly boiling. The alcohol was distilled off under vacuum. Ice and 3N hydrochloric acid were added to the concentrate with stirring. The product precipitated and was collected. It was washed with water, dilute hydrochloric acid then water and dried. The yield was 5.7 grams. This material was dissolved in fifty milliliters of tetrahydrofuran and 1.5 grams of lithium aluminum hydride was added slowly with stirring. After about three minutes the reaction mixture set to a hard gel. Fifteen milliliters of ether was added and the mixture stirred for one hour. Ethyl acetate and water were added. The aqueous phase was separated, extracted with ether and then with methylene chloride. The nonaqueous phase and the extracts were combined, dried over magnesium sulfate and filtered. The filtrate on standing overnight deposited 1.6 grams of crystals having a melting point of 223 to 230 degrees centigrade. The liquor was concentrated to dryness and triturated with methylene chloride to give an additional 1.3 grams with a melting point of 203 to 210 degrees centigrade. The two crops were combined and crystallized from fifteen milliliters of alcohol, containing 0.5 milliliters of water. The yield of 17α-methyl-5-androstene-3β,11β,17β-triol was 1.7 grams and the melting point 227 to 230 degrees centigrade. Recrystallization from ethyl acetate yielded 1.2 grams melting at 230 to 235 degrees centigrade and having a rotation of $[\alpha]_D$ minus 68 degrees (dioxane).

*Analysis.*—Calculated for $C_{20}H_{32}O_3$: C, 74.95; H, 10.07. Found: C, 74.53; H, 10.16.

Infrared spectra show OH bands at 3610 and 3280, isolated C=C at 1665 (weak) and alcohol C—O at 1146, 1085, 1054, and 1030 centimeters$^{-1}$.

In the same manner as described in Preparation 1, but employing 11α - hydroxy - 17 - methyltestosterone (U.S. 2,660,586), 17-methyltestosterone and 9(11)-dehydro-17-methyltestosterone as starting steroid, there is thusproduced 17α-methyl-5-androstene-3β,11α,17β-triol, 17α-methyl - 5 - androstene-3β,17β-diol and 17α-methyl-5,9 (11)-androstadiene-3β,17β-diol, respetcively.

PREPARATION 2.—17α-METHYL-9(11)-DEHYDROTESTOSTERONE

A warm solution of one gram of 11α-hydroxy-17-methyltestosterone in dry pyridine was mixed with one gram of para-toluenesulfonyl chloride. The mixture was maintained at room temperature for eighteen hours and then poured into 25 milliliters of water. The mixture was stirred until the precipitated oil solidified. The solid was filtered, washed with water and dried to give 11α-(p-toluenesulfonyloxy)-17-methyltestosterone which, after crystallization from a mixture of methylene chloride and hexane hydrocarbons, was a light colored crystalline solid.

A mixture of one gram of the thus-produced 11α-(p-toluenesulfonyloxy)-17-methyltestosterone, 0.2 gram of sodium formate, 0.57 milliliter of water and fourteen milliliters of absolute ethanol was heated at its refluxing temperature for nineteen hours. The solution was cooled and then poured into fifty grams of a mixture of ice and water with stirring. The resulting precipitate was filtered and dried to give 9(11)-dehydro-17-methyltestosterone which, after crystallization from a mixture of methylene chloride and hexane hydrocarbons, was a light colored crystalline solid.

PREPARATION 3.—11β-HYDROXY-17α-METHYL-6-DEHYDROTESTOSTERONE

To a solution of two grams of 17α-methyl-5-androstene-3β,11β,17β-triol and twelve grams of para-quinone in 150 milliliters of toluene (dried by distilling off thirty milliliters) was added 2.0 grams of aluminum tertiary-butoxide. After refluxing for fifty minutes the solution was cooled and washed with dilute sodium hydroxide and water. The aqueous phases were extracted with methylene chloride. The nonaqueous solutions were combined and the methylene chloride removed by distillation. The toluene solution was poured into a 100 gram magnesium silicate (Florisil) column packed wet with hexanes (Skellysolve B) and eluted with increasing amounts of acetone in hexanes. The fraction eluted with 17 to 20 percent acetone yielded 0.6 gram of 11β-hydroxy-17α-methyl-6-dehydrotestosterone which on recrystallization from ethyl acetate-acetone gave 0.4 gram of purified product of melting point 246 to 254 degrees centigrade and having a rotation of $[\alpha]_D$ plus 150 degrees (chloroform) and ultraviolet absorption of $$\lambda^{alc.}_{max.}\ 284.5\ m\mu,\ a_M\ 24{,}825$$

*Analysis.*—Calculated for: $C_{20}H_{28}O_3$: C, 75.91; H, 8.92. Found: C, 75.97; H, 9.13.

In the same manner as described in Preparation 3, but employing 17α-methyl-5-androstene-3β,11α,17β-triol, and 17α-methyl-5,9(11)-androstadiene-3β,17β-diol as starting steroid, there is thus-produced 6-dehydro-11α-hydroxy-17-methyltestosterone and 6,9(11)-bisdehydrotestosterone, respectively.

PREPARATION 4.—6-DEHYDRO-17-METHYLTESTOSTERONE

A solution of forty grams of 17α-methyl-5-androstene-3β,17β-diol and 170 grams of para-quinone in 1.3 liters of toluene was distilled until 250 milliliters of distillate had been collected. To the remaining solution was added with stirring a solution of 32 grams of aluminum tertiary butoxide in 100 milliliters of dry toluene. The mixture was refluxed for fifty minutes and then about half the toluene evaporated under a stream of nitrogen. Ether was added and the solution washed with aqueous sodium hydroxide and then with water. The aqueous phases were extracted with ether which was combined with the ether phase and then dried and the solvent evaporated. The residue, dissolved in hexanes, was chromatographed through a column of 300 grams of magnesium silicate (Florisil) which was developed with 250 milliliter portions of solvent of the following composition and order: two of hexanes, seven of hexane plus two percent acetone, four of hexanes plus four percent acetone, eight of hexanes plus six percent acetone, five of hexanes plus ten perecnt acetone, eleven of hexanes plus twelve percent acetone and four of hexanes plus twenty percent acetone. Fractions 22 to 26 were combined and recrystallized from a mixture of hexanes plus acetone to give 6.5 grams of 6-dehydro-17-methyltestosterone melting at 182 to 191 degrees centigrade, having an $[\alpha]_D$ (chloroform) of +21 degrees, a $\lambda_{max.}^{alc.}$ 284 m$\mu$, $a_M = 22,725$ and the analysis below.

*Analysis.*—Calculated for $C_{20}H_{28}O_2$: C, 79.95; H, 9.39. Found: C, 79.60; H, 9.55.

PREPARATION 5.—11β-HYDROXY-6-DEHYDROTESTOSTERONE 0.5 gram of 11β-hydroxytestosterone was dissolved in fifty milliliters of tertiary butyl alcohol and then refluxed under nitrogen after the addition of 0.5 gram of recrystallized chloranil. After 2.5 hours the mixture was concentrated under a fast stream of nitrogen, diluted with methylene chloride and the solution washed with dilute sodium hydroxide, water and then dried. The dried solution was filtered and the solvent distilled. The residual 11β-hydroxy-6-dehydrotestosterone was dissolved in benzene and chromatographed over a 100 gram column of magnesium silicate. The column was eluted with hexane hydrocarbons (Skellysolve B) containing increasing proportions of acetone. The eluates were collected in 250 milliliter fractions and the solvent removed. The fraction containing the largest amount of residual solids contained substantially pure 11β-hydroxy-6-dehydrotestosterone.

Following the procedure of Preparation 5 but substituting as starting steroid testosterone, 11α-hydroxytestosterone, 11-ketotestosterone, 9(11)-dehydrotestosterone, 9(11)-dehydro-17-methyltestosterone and 11-keto-17-methyltestosterone, there is thus-produced 6-dehydrotestosterone, 6-dehydro-11α-hydroxytestosterone, 6-dehydro-11-ketotestosterone, 6,9(11)-bisdehydrotestosterone, 6,9(11)-bisdehydro-17-methyltestosterone and 6-dehydro-11-keto-17-methyltestosterone, respectively.

EXAMPLE 1

*7,17-dimethyltestosterone*

A mixture of 0.4 gram of cuprous chloride, twenty milliliters of 4M methylmagnesium bromide in ether and sixty milliliters of redistilled tetrahydrofuran was stirred and cooled in an ice bath during the addition of a mixture of 2.0 grams of 6-dehydro-17-methyltestosterone, sixty milliliters of redistilled tetrahydrofuran and 0.2 gram of cuprous chloride. The ice bath was removed and stirring was continued for four hours. Ice and water were than carefully added, the solution acidified with 3N hydrochloric acid and extracted several times with ether. The combined ether extracts were washed with a brine-sodium carbonate solution, brine and then dried over anhydrous magnesium sulfate, filtered and then poured over a 75 gram column of magnesium silicate (Florisil) packed wet with hexanes (Skellysolve B). The column was eluted with 250 milliliters of hexanes, 0.5 liter of two percent acetone, two liters of four percent acetone and 3.5 liters of six percent acetone in hexanes. Four 250 milliliter fractions were collected followed by 150 milliliter fractions. The residues from fractions eight to sixteen were combined and rechromatographed over a 125 gram column of magnesium silicate. The column was eluted with six percent acetone in hexanes which was collected in 150 milliliter portions. Fractions 18 to 29 were combined and dissolved in acetone, decolorized with charcoal, and recrystallized from acetone. One gram of a crystalline mixture of the 7-epimers of 7,17-dimethyltestosterone was obtained melting at 120 to 140 degrees centigrade, $\lambda_{max.}^{alc.}$ 243 m$\mu$, $a_M = 13,775$, $[\alpha]_D +55$ degrees (chloroform)

*Analysis.*—Calculated for $C_{21}H_{32}O_2$: C, 79.69; H, 10.19. Found: C, 79.18; H, 10.07.

The 7-isomers are separated one from the other according to the procedure described in Example 3. 7α,17-dimethyltestosterone melts at 163 to 165 degrees centigrade and 7β,17-dimethyltestosterone melts at 127 to 129 degrees centigrade.

EXAMPLE 2

*1-dehydro-7α,17α-dimethyltestosterone*

A mixture of 8.0 g. of 7α,17α-dimethyltestosterone, 8.0 g. of mercury, 6.5 ml. of acetic acid, 5.0 g. of selenium dioxide and 300 ml. of t-butyl alcohol was stirred and refluxed under nitrogen for 4 hours. An additional 2.0 grams of selenium dioxide was added and after refluxing for a total of 7 hours the reaction mixture was concentrated to about 200 milliliters under a fast stream of nitrogen. After diluting with a mixture of methylene chloride and ether, the solution was washed three times with freshly prepared ammonium sulfide, twice with diluted ammonium hydroxide and twice with water. The washed solution was dried, filtered and concentrated to dryness. The gummy product was dissolved in methylene chloride and poured on a 200 g. Florisil column packed wet with Kkellysolve B. The column was washed with increasing amounts of acetone in Skellysolve B. Those fractions of eluted material which were identified as 1-dehydro-7α,17α-dimethyltestosterone by paper chromatogram analysis were combined and recrystallized from a mixture of acetone and Skellysolve B. There was thus obtained 1-dehydro-7α,17α-dimethyltestosterone in the form of a white crystalline solid having a melting point of 153 to 156 degrees centigrade; $[\alpha]_D -6$ degrees (chloroform)

$\lambda_{max.}^{alc.}$ 243.5 m$\mu$, $a_M = 15,500$

*Analysis.*—Calculated for $C_{21}H_{30}O_2$: C, 80.21; H, 9.62. Found: C, 80.29; H, 9.76.

EXAMPLE 3

*7,17-dimethyl-11β-hydroxytestosterone*

A solution was prepared by the addition of 100 milliliters of 3M methyl magnesium bromide in ether to a mixture of 1.6 grams of cuprous chloride in 240 milliliters of purified tetrahydrofuran. To this solution was added a solution of 8.0 grams of 6-dehydro-11β-hydroxy-17-methyltestosterone and 0.8 gram of partially dissolved cuprous chloride in 300 milliliters of tetrahydrofuran, under nitrogen and with stirring and cooling in an ice-salt bath. After fifteen minutes, the reaction mixture was poured into a mixture of ether and dilute hydrochloric acid and ice and saturated with sodium chloride. The ether phase was separated, washed with brine followed by dilute sodium hydroxide saturated with sodium chloride and then again with brine, and then dried over magnesium sulfate. The dried solution was filtered and concentrated to dryness. The residue was dissolved in methylene chloride which was then poured onto a 250 gram magnesium silicate (Florisil) chromatographic column. The column was developed with 250 milliliter portions of solvent of the following composition and order: three of methylene chloride, two of methylene chloride plus two percent acetone, two of methylene chloride plus three percent acetone, nine of methylene chloride plus four percent acetone, two of methylene chloride plus ten percent acetone, three of methylene chloride plus fifty percent acetone, and finally, one of acetone. Fractions ten to twenty, eluted with the four to ten percent acetone in methylene chloride, were combined, the solvent evaporated and the residue dissolved in hot methanol, filtered, the filtrate freed of solvent and the residue triturated with a mixture of acetone and hexane hydrocarbons. A 3.2 gram crystalline mixture of the 7-stereoisomers of 7,17-dimethyl-11β-hydroxytestosterone was obtained which melted at 218 to 224 degrees centigrade (presoftening), had a $\lambda_{max.}^{alc.}$ 243 m$\mu$, $a_M = 15,175$ and an $[\alpha]_D + 102$ degrees in chloroform.

*Analysis.*—Calculated for $C_{21}H_{32}O_3$: C, 75.86; H, 9.70. Found: C, 75.56; H, 9.57.

The pure 7($\beta$) isomer of 7,17-dimethyl-11β-hydroxytestosterone was obtained by six crystallizations of the crystalline mixture of isomers described above from a mixture of acetone and methanol and melted at 242 to 246 degrees centigrade (dec.), had a $\lambda_{max.}^{alc.}$ 245.5 m$\mu$, $a_M = 15,175$ and an $[\alpha]_D$ of $+105$ degrees in chloroform.

*Analysis.*—Calculated for $C_{21}H_{32}O_3$: C, 75.86; H, 9.70. Found: C, 75.59; H, 10.04.

To obtain the 7($\alpha$)-isomer 0.5 gram of the crystalline mixture of the 7 stereoisomers of 7,17-dimethyl-11β-hydroxytestosterone was refluxed in fifty milliliters of tertiary butyl alcohol with 0.5 gram of recrystallized chloranil under nitrogen for 2.5 hours. The reaction mixture was concentrated under a fast stream of nitrogen, diluted with methylene chloride and the solution washed with dilute sodium hydroxide, water and then dried, filtered and the solvent removed. The residue, showing $\lambda_{max.}^{alc.}$ at 245 and 291 m$\mu$ was combined with the product from an identical run and chromatographed through a 100 gram magnesium silicate column developed with 250 milliliter portions of solvent of the following composition and order: two each of hexane hydrocarbons (Skellysolve B), hexanes plus four percent acetone, hexanes plus eight percent acetone, hexanes plus twelve percent acetone, hexanes plus fourteen percent acetone, hexanes plus sixteen percent acetone, hexanes plus eighteen percent acetone, hexanes plus twenty percent acetone, hexanes plus twenty-four percent acetone, hexanes plus tweny-eight percent acetone, and two of acetone. The residues from fractions fifteen to eighteen, eluted with eighteen percent acetone, were combined and crystallized from acetone to give 100 milligrams of 7,17 - dimethyl - 11β - hydroxy-6-dehydro-testosterone, melting point 242 to 244 degrees centigrade (dec.), $\lambda_{max.}^{alc.}$ 295.5 m$\mu$, $a_M = 23,250$, $[\alpha]_D + 310$ degrees (chloroform)

*Analysis.*—Calculated for $C_{21}H_{30}O_3$: C, 76.32; H, 9.15. Found: C, 76.49; H. 9.53.

The residues from fractions eleven to fourteen, eluted with sixteen to eighteen percent acetone, were combined and chromatographed through a fifty gram 1:1 charcoal (Darco)-diatomaceous earth (Celite) column. The column was developed with solvent of the following composition and order: nine-100 milliliter portions of methanol, five-100 milliliter portions of a 1:1 mixture of methanol and acetone, seven-fifty milliliter portions of a 1:1 mixture of methanol and acetone, seven-fifty milliliter portions of a 1:2 mixture of methanol and acetone, three-fifty milliliter portions of acetone and four-fifty milliliter portions of a 1:4 mixture of acetone and methylene chloride. Fractions twelve to twenty were combined, the solvent evaporated and the residue crystallized from acetone to give sixty milligrams of the 7($\alpha$)-epimer of 7,17-dimethyl-11β-hydroxytestosterone, melting point 225 to 230 degrees centigrade (presoftening), $\lambda_{max.}^{alc.}$ 243 m$\mu$, $a_M = 15,825$

*Analysis.*—Calculated for $C_{21}H_{32}O_3$: C, 75.86; H, 9.70. Found: C, 75.65; H, 9.96.

EXAMPLE 4

*1-dehydro-7α,17-dimethyl-11β-hydroxytestosterone*

Following the procedure of Example 2, but substituting 7α,17-dimethyl-11β-hydroxytestosterone for 7α,17α-dimethyltestosterone, there is obtained 1-dehydro-7α,17-dimethyl-11β-hydroxytestosterone.

EXAMPLE 5

*7,17-dimethyl-9(11)-dehydrotestosterone*

Following the procedure of Examples 1 and 3, but substituting 17-methyl-6,9(11)-bisdehydrotestosterone as the starting steroid, there are produced the 7α and 7β-epimers of 7,17-dimethyl-9(11)-dehydrotestosterone. 7α,17-dimethyl-9(11)-dehydrotestosterone is a white crystalline solid having a metling point of 172 to 176° C;

$\lambda_{max.}^{alc.}$ 240 m$\mu$, $a_M = 16,800$

The foregoing compound is also obtained from 7α,17α-dimethyl-11α-hydroxytestosterone [M.P. 230 to 234.5 degrees centigrade, $[\alpha]_D + 81$ degrees (chloroform)

$\lambda_{max.}^{alc.}$ 243 m$\mu$ obtained by 11α-hydroxylation of 7α,17α-dimethyltestosterone using the procedure described in U.S. Patent 2,602,769] by 11α-tosylation and reaction of the 11α-tosylate with sodium formate in aqueous alcohol solution according to the procedure described in U.S. Patent 2,793,218, Example 3.

EXAMPLE 6

*7,17-dimethyl-1,9(11)-bisdehydrotestosterone*

Following the procedure of Example 2, but substituting 7,17-dimethyl-9(11)-dehydrotestosterone for 7α,17α-dimethyltestosterone, there is obtained 7,17-dimethyl-1,9(11)-bis-dehydrotestosterone.

EXAMPLE 7

*7-methyl-11β-hydroxytestosterone*

Following the procedure of Examples 1 and 3, but substituting 11β-hydroxy-6-dehydrotestosterone as the starting steroid, there is produced 7-methyl-11β-hydroxytestosterone.

Similarly, 6-dehydrotestosterone and 6-dehydrotestosterone acetate are converted to 7-methyltestosterone, 6-dehydro-11α-hydroxytestosterone 17-acetate and 6-dehydro-11α-hydroxytestosterone to 7-methyl-11α-hydroxytestosterone, 6 - dehydro-11α-hydroxy-17-methyltestosterone to 7,17-dimethyl-11α-hydroxytestosterone, 6-dehydro-11-ketotestosterone acetate and 6-dehydro-11-ketotestosterone to 7-methyl-11-ketotestosterone, 6,9(11)-bisdehydrotestosterone acetate and 6,9(11)-bisdehydrotestosterone to 7-methyl-9(11)-dehydrotestosterone and 6-dehydro-11-keto-17-methyltestosterone to 7,17-dimethyl-11-ketotestosterone.

The 7-isomers of each of the above 7-methyltestosterones described in Examples 1, 3, 5, and 7 can be separated by fractional crystallization to remove the more insoluble isomer and reaction of the resulting mixture from the mother liquors with chloranil in the manner described in Example 3 to produce the corresponding 7-methyl-6-dehydrotestosterone, which compounds also possess androgenic and anabolic activity, and then separating the residual 7-epimer of 7-methyltestosterone therefrom.

EXAMPLE 8

1-dehydro-7-methyl-11β-hydroxytestosterone

Following the procedure of Example 2, but substituting 7-methyl-11β-hydroxytestosterone for 7α,17α-dimethyltestosterone, there is obtained 1-dehydro-7-methyl-11β-hydroxytestosterone.

Similarly, 7-methyltestosterone, 7-methyl-11α-hydroxytestosterone, 7,17-dimethyl-11α-hydroxytestosterone, 7-methyl-11-ketotestosterone, 7 - methyl-9(11)-dehydrotestosterone and 7,17-dimethyl-11-ketotestosterone are converted to 1-dehydro-7-methyltestosterone, 1-dehydro-11α-hydroxy-7-methyltestosterone, 1 - dehydro-7,17-dimethyl-11α-hydroxytestosterone, 1-dehydro-7-methyl-11-ketotestosterone, 7-methyl-1,9(11)-bisdehydrotestosterone, and 1 - dehydro - 7,17 - dimethyl - 11 - ketotestosterone, respectively.

EXAMPLE 9

7-methyl-11β-hydroxytestosterone 17-acetate

A solution of 1.0 gram of 7-methyl-11β-hydroxytestosterone, dissolved in six milliliters of dried and redistilled pyridine, was treated with six milliliters of acetic anhydride. After standing at room temperature for seventeen hours, it was poured into ice water. The mixture was filtered after two hours of standing and the precipitate was washed with water and dried in vacuo. Upon recrystallization from an acetone-hexane mixture substantially pure 7-methyl-11β-hydroxytestosterone 17-acetate was obtained.

In the same manner as given in Example 9, by the reaction of 7-methyl-11β-hydroxytestosterone with propionic anhydride, 7-methyl-11β-hydroxytestosterone 17-propionate was obtained.

In the same manner as given in Example 9, by reaction of 1-dehydro-7-methyl-11β-hydroxytestosterone with acetic anhydride or propionic anhydride there are obtained the 17-acetate and 17-propionate, respectively, of 1-dehydro-7-methyl-11β-hydroxytestosterone.

EXAMPLE 10

7-methyl-11β-hydroxytestosterone 17-benzoate

Three-tenths gram (0.3 gram) of 7-methyl-11β-hydroxytestosterone, suspended in twelve milliliters of dry benzene, was treated with 0.3 milliliter of distilled benzoyl chloride and 0.3 milliliter of dry pyridine. The mixture was stirred for seventeen hours at room temperature. After refrigeration, the product was collected on a filter, washed with benzene and ether, and dried. Recrystallization from ethyl acetate gave substantially pure 7-methyl-11β-hydroxytestosterone 17-benzoate.

In the same manner as given in Examples 5 and 6, the 17β-cyclopentylpropionate, butyrate, isobutyrate, valerate, isovalerate, hexanoate, heptanoate, octanoate, phenylacetate, p-hexyloxyphenylpropionate, and other like 17-esters of 7-methyl-11β-hydroxytestosterone and 1-dehydro-7-methyl-11β-hydroxytestosterone are prepared by the reaction of 7-methyl-11β-hydroxytestosterone and 1-dehydro-7-methyl-11β-hydroxytestosterone with the selected acid anhydride or halide. Treatment of 7-methyl-11β-hydroxytestosterone with formic acid produces 7-methyl-11β-hydroxytestosterone 17-formate.

Similarly, following the procedure of Examples 9 and 10 and the paragraphs following, 7-methyltestosterone, 1-dehydro-7-methyltestosterone, 7 - methyl-11-ketotestosterone and 1-dehydro-7-methyl-11-ketotestosterone are converted to their 17-acetate, 17-propionate, 17-benzoate and the other esters named therein.

Substituting 7-methyl-11α-hydroxytestosterone as the starting steroid in the reactions described in Examples 5 and 6 and the paragraph following is productive of the corresponding 11α,17-diesters of 7-methyl-11α-hydroxytestosterone.

EXAMPLE 11

7-methyl-11-ketotestosterone 17-benzoate

A solution of 1.5 grams of 7-methyl-11β-hydroxytestosterone 17-benzoate in eighty milliliters of acetic acid was treated with a solution of 0.74 gram of chromic acid anhydride in four milliliters of water and eighty milliliters of acetic acid and allowed to stand at room temperature for five hours. The excess chromic acid was destroyed by the addition of ten milliliters of methanol and the solution was concentrated in vacuo on a water bath. The residue, after trituration with water, was extracted with ether and the ether solution washed with dilute sodium hydroxide solution and water, and then dried over anhydrous sodium sulfate. Upon evaporation of the ether there was obtained 7-methyl-11-ketotestosterone 17-benzoate.

EXAMPLE 12

7-methyl-11-ketotestosterone 17-acetate

A solution of 7-methyl-11β-hydroxytestosterone 17-acetate in acetic acid was agitated for twelve hours with an aqueous solution of chromic acid anhydride. The steroid product was extracted thoroughly with benzene which was washed with a sodium bicarbonate solution and then water, dried over anhydrous sodium sulfate, and evaporated to give 7-methyl-11-ketotesterone 17-acetate.

In the same manner as given in Examples 11 and 12, 7-methyl-11-ketotestosterone 17-formate, 17-butyrate, 17-isobutyrate, 17-valerate, 17-isovalerate, 17-hexanoate, 17-heptanoate, 17-octanoate, 17-benzoate, 17-phenylacetate, 17 - (β-cyclopentyl)-propionate, 17-p-butyloxyphenylpropionate, and like 17-esters of 7-methyl-11-ketotestosterone are prepared by reaction of the corresponding 7-methyl-11β-hydroxytestosterone 17-ester with chromic anhydride in acetic acid or with an acidified dichromate solution.

Following the procedure of Example 11, 7,17-dimethyl-11β-hydroxytestosterone is converted to 7,17-dimethyl-11-ketotestosterone.

EXAMPLE 13

7-methyl-11-ketotestosterone

A solution of 1.0 gram of 7-methyl-11-ketotestosterone 17-propionate in fifty milliliters of 1 normal methanolic potassium hydroxide solution containing three milliliters of water was refluxed for a period of thirty minutes. The solution was poured onto ice and the mixture neutralized with dilute sulfuric acid. After standing, the resulting precipitate was recovered, washed with water and dried. The aqueous filtrate was extracted with methylene chloride to recover an additional amount of material. Substantially pure 7-methyl-11-ketotestosterone is obtained when this residue is recrystallized from methylene chloride.

EXAMPLE 14

7-methyl-9(11)-dehydrotestosterone

A two-phase mixture of 2.5 grams of 7-methyl-11β-hydroxytestosterone, 250 milliliters of benzene, 200 milliliters of ether, 100 milliliters of concentrated hydrochloric acid, and 100 milliliters of water was heated under reflux for eighteen hours with vigorous stirring. After cooling, the two layers were separated and the aqueous layer extracted three times with 75-milliliter portions of ether. The ether extracts were combined with the benzene-ether layer, and then washed with dilute aqueous potassium carbonate solution and with water. The washed solution was dried over anhydrous sodium sulfate and, after removal of the drying agent, the solvent was evaporated. The residue was recrystallized from a mixture of methylene chloride and hexane hydrocarbons (Skellysolve B) to provide 7-methyl-9(11)-dehydrotestosterone.

Following the procedure of Example 14, 1-dehydro-7-methyl-11β-hydroxytestosterone is converted to 7-methyl-1,9(11)-bisdehydrotestosterone.

EXAMPLE 15

7-methyl-9(11)-dehydrotestosterone 17-propionate

A solution of 250 milligrams of 7-methyl-9(11)-dehydrotestosterone in thirty milliliters of benzene was prepared, and eighteen milliliters of benzene was distilled to dry the solution. After cooling, the dried solution was treated with two milliliters of dry pyridine and two milliliters of propionic anhydride and maintained at a temperature of about 26 degrees centigrade for 22 hours. The mixture was then treated with 25 milliliters of water and extracted with ether. The ether extract was washed with dilute aqueous hydrochloric acid and then with dilute aqueous sodium hydroxide solution, followed by water. The solution was dried over anhydrous sodium sulfate, and, after removing the drying agent, the solvent was evaporated in vacuo. The residue was crystallized from absolute methanol to yield substantially pure 7-methyl-9(11)-dehydrotestosterone 17-propionate.

In the same manner, but employing benzoyl chloride, 7-methyl-9(11)-dehydrotestosterone 17-benzoate is prepared.

Following the procedure of Example 15, 7-methyl-1,9(11)-bisdehydrotestosterone is converted to its 17-propionate.

EXAMPLE 16

7-methyl-9(11)-dehydrotestosterone 17-(β-cyclopentylpropionate)

A solution of 250 milligrams of 7-methyl-9(11)-dehydrotestosterone in 25 milliliters of benzene was prepared and dried by distilling twelve milliliters of benzene from the solution. After cooling, the solution was treated with 0.25 milliliter of dry pyridine and 0.25 milliliter of β-cyclopentylpropionyl chloride and was maintained at about 26 degrees centigrade for five hours, during which time pyridine hydrochloride separated. The resulting mixture was treated with twenty milliliters of water and then extracted with ether. After washing the ether extract with dilute aqueous hydrochloric acid, dilute aqueous sodium hydroxide, and water, it was dried over anhydrous sodium sulfate. After removal of the drying agent, the solvent was evaporated to give a residue of 7-methyl-9(11)-dehydrotestosterone 17-(β-cyclopentylpropionate).

In the same manner, but replacing 7-methyl-9(11)-dehydrotestosterone by 7-methyl-1,9(11)-bisdehydrotestosterone, there is obtained 7-methyl-1,9(11) - bisdehydrotestosterone 17-(β-cyclopentylpropionate).

In the same manner reacting 7-methyl-9(11)-dehydrotestosterone or 7-methyl - 1,9(11) - dehydrotestosterone with the appropriate acylating agent provides other representative 17-cycloalkylalkanoates of 7-methyl-9(11)-dehydrotestosterone or 7-methyl - 1,9(11) - dehydrotestosterone, including the 17-cyclopentylformate, cyclohexylformate, cyclopentylacetate, cyclobutylformate, α-cyclopentylpropionate, cyclohexylacetate, cyclopropylformate, cycloheptylformate, β-(methylcyclopentyl)-acetate, β-cyclobutylpropionate, and other 17-cycloalkylalkanoates.

In the same manner as shown in Examples 15 and 16, other acylates of 7-methyl-9(11)-dehydrotestosterone or 7-methyl-1,9(11)-bisdehydrotestosterone are prepared by reacting 7-methyl-9(11)-dehydrotestosterone or 7-methyl-1,9(11)-bisdehydrotestosterone, preferably in pyridine solution, with the acyl halide or the anhydride of a hydrocarbon carboxylic acid preferably containing from one to twelve carbon atoms, inclusive. Other representative esters of 7-methyl-9(11)-dehydrotestosterone or 7-methyl-1,9(11) - bisdehydrotestosterone thus-prepared include the acetate, butyrate, isobutyrate, valerate, isovalerate, hexanoate, heptanoate, octanoate, phenylacetate, phenylpropionate, p-hexyloxyphenylpropionate, and trimethylacetate.

EXAMPLE 17

7-methyl-9α-bromo-11β-hydroxytestosterone 17-propionate

Two grams of 7-methyl-9(11)-dehydrotestosterone 17-propionate, dissolved in 100 milliliters of acetone, were cooled to fifteen degrees centigrade and the solution was thereupon treated with two grams of N-bromoacetamide, dissolved in fifty milliliters of water. Maintaining the bath temperature at twelve degrees centigrade, a solution of ten milliliters of 0.8 N perchloric acid was added. Five minutes later another ten milliliters of perchloric acid was added and after ten more minutes a final twenty milliliters of the same 0.8 N perchloric acid was added. At the end of twenty minutes total reaction time, a saturated solution of sodium sulfite was added slowly with mixing. The mixture was thereupon diluted with 200 milliliters of water and the product, thus separated, was recovered by filtration, washed well with water and dried over anhydrous sodium sulfate, and the solvent separated by distillation, leaving a residue of 7-methyl-9α-bromo-11β-hydroxytestosterone 17-propionate.

In the same manner as given in Example 17, 7-methyl-9(11)-dehydrotestosterone 17-benzoate, 7-methyl-9(11)-dehydrotestosterone 17-acetate, 7-methyl-9(11)-dehydrotestosterone 17-butyrate, 7-methyl-9(11)-dehydrostestosterone 17-isobutyrate, 7 - methyl-9(11)-dehydrotestosterone 17-valerate, 7-methyl-9(11)-dehydrotestosterone 17-hexanoate, 7-methyl-9(11)-dehydrotestosterone 17-(β-cyclophenylpropionate) and 7-methyl-9(11)-dehydrotestosterone 17-phenylacetate gave the corresponding 7-methyl-9α-bromo - 11β - hydroxytestosterone 17-acylates by reaction with N-bromoacetamide in acetone solution in the presence of aqueous perchloric acid.

Using the procedure described in Example 17, but replacing 7-methyl-9(11)-dehydrotestosterone 17-propionate by 7-methyl-1,9(11)-bisdehydrotestosterone 17-propionate, there is obtained 1-dehydro-7-methyl-9α-bromo-11β-hydroxytestosterone 17-propionate. By employing other 17-acylates of 7-methyl-1,9(11)-bisdehydrostestosterone in place of the 17-propionate there are obtained the corresponding 17-acylates of 1-dehydro-7-methyl-9α-bromo-11β-hydroxytestosterone.

EXAMPLE 18

7-methyl-9α-chloro-11β-hydroxytestosterone 17-propionate

One gram of 7-methyl-9(11)-dehydrotestosterone 17-propionate, dissolved in fifty milliliters of tertiary butyl alcohol, was treated at room temperature, about twenty to 25 degrees centigrade, with one gram of N-chlorosuccinimide, dissolved in tertiary butyl alcohol. To this solution was added fifty milliliters of 0.1 N sulfuric acid. The mixture was stirred for a period of thirty minutes at room temperature and thereupon diluted with 300 milliliters of water and extracted with three fifty-milliliter portions of methylene chloride. The methylene chloride extracts were dried over anhydrous sodium sulfate and evaporated to give a residue which was recrystallized twice from methanol to give 7-methyl-9α-chloro-11β-hydroxytestosterone 17-propionate.

EXAMPLE 19

7,17-dimethyl-9α-bromo-11β-hydroxytestosterone

One gram of 7,17-dimethyl-9(11)-dehydrotestosterone, dissolved in dioxane (fifty millilters), was reacted at about 24 degrees centigrade with one gram of N-bromosuccinimide, dissolved in fifty milliliters of dioxane. To this solution was added fifty milliliters of 0.1 N sulfuric acid and the mixture was agitated at room temperature for a period of one hour. Thereafter, 300 milliliters of water was added and the reaction mixture was extracted with three fifty-milliliter portions of methylene chloride. The methylene chloride solution was washed with sodium thiosulfate solution and then with water and then dried over anhydrous sodium sulfate. Evaporation of the dried methylene chloride solution gave a residue which, after recrystallization from methanol, gave 7,17-dimethyl-9α-bromo-11β-hydroxytestosterone.

Using the procedure shown in Example 19, but substituting 7,17-dimethyl-1,9(11)-bisdehydrotestosterone for 7,17-dimethyl-9(11)-dehydrotestosterone, there is obtained 1-dehydro-7,17-dimethyl-9α-bromo-11β-hydroxytestosterone.

In the same manner as shown in Examples 17 to 19, inclusive, reacting 7-methyl-9(11)-dehydrotestosterone 17-acylate or 7-methyl-1,9(11)-bisdehydrotestosterone 17-acylate in tertiary butyl alcohol, dioxane, acetone, or the like, with a hypohalous acid, preferably produced by reaction of a strong acid such as perchloric, sulfuric, trichloroacetic acid and an N-haloamide or an N-haloimide especially N-haloacetamide or N-halosuccinimide produces the corresponding 7-methyl-9α-halo-11β-hydroxytestosterone 17-acylate or 1-dehydro-7-methyl-9α-halo-11β-hydroxytestosterone 17-acylate. Other such 7-methyl-9α-halo-11β-hydroxytestosterone acylates and 1-dehydro-7-methyl-9α-halo-11β-hydroxytestosterone 17-acylates thus produced include the 17-acetate, propionate, butyrate, valerate, isovalerate, β-cyclopentylpropionate, benzoate, phenylacetate, toluate, β-cyclopentylpropionate of 7-methyl-9α-iodo-11β-hydroxytestosterone, 1-dehydro-7methyl-9α-iodo-11β-hydroxytestosterone, 7-methyl-9α-chloro-11β-hydroxytestosterone, and 1-dehydro - 7 - methyl-9α-chloro-11β-hydroxytestosterone.

If 7-methyl-9α-halo-11β-hydroxytestosterone 17 - acylates are desired wherein the acyl radical is of an unsaturated acid such as acrylic, crotonic, cinnamic, fumaric, or maleic acid or the like, the selected 7-methyl-9α-halo-11β-hydroxytestosterone is reacted with the acid halide of such unsaturated acid to give the corresponding 7-methyl-9α-halo-11β-hydroxytestosterone 17-acylate.

EXAMPLE 20

*7-methyl-9β,11β-epoxytestosterone 17-propionate*

A solution of 1.36 grams of 7-methyl-9α-bromo-11β-hydroxytestosterone propionate, dissolved in fifty milliliters of methanol was titrated with 0.1 N aqueous sodium hydroxide until the solution remained basic to phenolphthalein upon standing for a period of thirty seconds. About 32 milliliters of base, equal to one equivalent, was required, Thereafter 300 milliliters of water was slowly added with stirring. The mixture was cooled and thereafter filtered and the precipitate thus obtained washed with water and dried over anhydrous sodium sulfate to give crude 7-methyl-9β,11β - epoxytestosterone 17 - propionate which was recrystallized from dilute methanol to give a substantially pure sample.

Using the procedure described in Example 20, but replacing 7-methyl-9α-bromo-11β-hydroxytestosterone propionate by 1 - dehydro - 7-methyl-9α-bromo-11β-hydroxytestosterone propionate, there is obtained 1-dehydro-7-methyl-9β,11β-epoxytestosterone 17-propionate.

In the same manner given in Example 20, 7-methyl-9α-bromo-11β-hydroxytestosterone was titrated with aqueous sodium hydroxide solution until the reaction mixture became basic to phenolphthalein for about one-half minute. The solution was then diluted with water and filtered to give a precipitate of 7-methyl-9β,11β- epoxytestosterone.

EXAMPLE 21

*7,17-dimethyl-9β,11β-epoxytestosterone*

A mixture of 7,17-dimethyl-9α-bromo-11β-hydroxytestosterone, potassium acetate and tertiary butyl alcohol was heated on a water bath for a period of one hour. The mixture was thereupon poured into ice water and the resulting precipitate collected on filter and recrystallized to give substantially pure 7,17-dimethyl-9β,11β-epoxytestosterone.

Using the procedure of Example 21, but replacing 7,17-dimethyl - 9α-bromo-11β-hydroxytestosterone by 1-dehydro - 7,17 - dimethyl-9α-bromo-11β-hydroxytestosterone, there is obtained 1-dehydro-7,17-dimethyl-9β,11β-epoxytestosterone.

In the same manner as shown in Example 21, other 7-methyl-9β,11β-epoxytestosterone 17-acylates are produced by reacting the 7-methyl-9α-halo-11β-hydroxytestosterone 17-acylates and the 1-dehydro-7-methyl-9α-halo-11β-hydroxytestosterone 17 - acylates described in Example 19 with a mild base. Representative 17-acylates thus produced include the 17-acetate, butyrate, isobutyrate, valerate, isovalerate, hexanoate, heptanoate, octanoate, toluate, trimethylacetate, acrylate, crotonate, and β-cyclopentylpropionate of 7-methyl-9β,11β-epoxytestosterone and 1-dehydro-7-methyl-9β,11β-epoxytestosterone.

EXAMPLE 22

*7-methyl-9α-fluoro-11β-hydroxytestosterone 17-propionate*

A chilled solution of 1.13 grams of 7-methyl-9β-11β-epoxytestosterone 17-propionate in twenty milliliters of alcohol-free chloroform was added to a chilled solution of alcohol-free chloroform into which hydrogen fluoride gas had been introduced for a period of three minutes. The mixture, contained in a polyethylene bottle, was maintained at minus fifteen degrees centigrade for a period of four hours and thereafter was poured into an excess of a saturated sodium bicarbonate solution. The aqueous layer was separated from the chloroform layer and extracted three times with chloroform. The combined chloroform layer and extracts were washed with water, dried over anhydrous sodium sulfate and the solvent evaporated to give a residue of 7-methyl-9α-fluoro-11β-hydroxytestosterone 17-propionate which was purified by chromatography over 100 grams of anhydrous magnesium silicate (Florisil) developed with from 20 to 1 to 9 to 1 mixture of hexane hydrocarbons (Skellysolve B) and acetone. The solvent was evaporated from the eluate fractions leaving 7-methyl-9α-fluoro-11β-hydroxytestosterone 17-propionate as the main solid fraction.

Using the procedure shown in Example 22, but replacing 7 - methyl - 9β,11β - epoxytestosterone 17-propionate by 1-dehydro-7-methyl-9β,11β-epoxy-testosterone 17-propionate, there is obtained 1-dehydro-7-methyl-9α-fluoro-11β-hydroxytestosterone 17-propionate.

EXAMPLE 23

*7,17-dimethyl-9α-fluoro-11β-hydroxytestosterone*

In the same manner as shown in Example 22, 7,17-dimethyl - 9β,11β-epoxytestosterone and 1-dehydro-7,17-dimethyl-9β,11β-epoxytestosterone were treated with hydrogen fluoride gas dissolved in alcohol-free chloroform to give 7,17-dimethyl-9α-fluoro-11β-hydroxytestosterone and 1 - dehydro-7,17-dimethyl-9α-fluoro-11β-hydroxytestosterone, respectively.

In the same manner as given in Example 22, reacting any of the 9β,11β-epoxides described in Example 21 and the paragraphs following, in methylene chloride with hydrogen fluoride or with aqueous hydrofluoric acid in the presence of perchloric acid is productive of the corresponding 7-methyl-9α-fluoro-11β-hydroxytestosterone acylate and 1-dehydro-7-methyl-9α-fluoro-11β-hydroxytestosterone acylate, e.g., 7 -methyl - 9α-fluoro-11β-hydroxytestosterone 17-benzoate and 17-phenylacetate, 7-methyl-9α - fluoro-11β-hydroxytestosterone 17-acetate, 7-methyl-9α - fluoro-11β-hydroxytestosterone 17-(β-cyclopentylpropionate), 1 - dehydro-7-methyl-9α-fluoro-11β-hydroxytestosterone 17 - acetate and 17 - propionate, and other 7-methyl - 9α-fluoro-11β-hydroxytestosterone 17-acylates including the 17-butyrate, isobutyrate, valerate, isovalerate, hexanoate, heptanoate, octanoate, phenylpropionate, toluate, cinnamate, p-butyloxyphenylpropionate, and trimethylacetate.

EXAMPLE 24

7-methyl-9α-fluoro-11-ketotestosterone 17-propionate

A solution of 0.779 gram of 7-methyl-9α-fluoro-11β-hydroxytestosterone 17-propionate in forty milliliters of glacial acetic acid was treated with a solution of 0.37 gram of chromium trioxide, dissolved in two milliliters of water and forty milliliters of glacial acetic acid. The reaction mixture was allowed to stand at room temperature for a period of five hours. Thereafter, ten milliliters of methanol was added, then 200 milliliters of water, and the mixture was extracted with ether, the ether fraction washed with sodium bicarbonate solution and water, evaporated, the residue recrystallized from methylene chloride-hexane hydrocarbons solution and finally from dilute acetone to give 7 - methyl-9α-fluoro-11-ketotestosterone 17-propionate.

Following the procedure of Example 20, 7,17-dimethyl-9α-fluoro-11β-hydroxytestosterone was converted to 7,17-dimethyl-9α-fluoro-11-ketotestosterone, 1-dehydro-7-methyl - 9α - fluoro-11β-hydroxytestosterone 17-propionate was converted to 1-dehydro-7-methyl-9α-fluoro-11-ketotestosterone 17 - propionate, and 1 - dehydro-7,17-dimethyl-9α-fluoro-11β-hydroxytestosterone was converted to 1-dehydro-7-17-dimethyl-9α-fluoro-11β-hydroxytestosterone.

In the same manner as shown in Example 20, 7-methyl-9α-chloro-11β-hydroxytestosterone 17-propionate was oxidized with chromium trioxide in glacial acetic acid to give 7-methyl-9α-chloro-11-ketotestosterone 17-propionate. 7-methyl - 9α - iodo-11β-hydroxytestosterone 17-propionate gave 7-methyl-9α-iodo-11-ketotestosterone 17-propionate, 7 - methyl-9α-fluoro-11β-hydroxytestosterone 17-benzoate gave 7 - methyl-9α-fluoro-11-ketotestosterone 17-benzoate and 7-methyl-9α-fluoro-11β-hydroxytestosterone 17-phenylacetate gave 7-methyl-9α-fluoro-11-ketotestosterone 17-phenylacetate.

In the same manner given in Example 20, oxidizing the corresponding 9α-halo-11β-hydroxy compound in glacial acetic acid solution with chromic trioxide produced the following compounds: 7-methyl - 9α-fluoro-11-ketotestosterone 17-acetate; 7 - methyl - 9α-fluoro-11-ketotestosterone 17 - (β - cyclopentylpropionate); 7-methyl-9α-fluoro-11-ketotestosterone 17-butyrate, isobutyrate, valerate, isovalerate, hexanoate, heptanoate, octanoate, phenylpropionate, toluate, and trimethylacetate– 1-dehydro-7-methyl-9α-fluoro-11-ketotestosterone 17-acetate and 17-(β-cyclopentylpropionate).

7-methyl-9α-fluoro-11-ketotestosterone 17-acylates and 1 - dehydro - 7-methyl-9α-fluoro-11-ketotestosterone 17-acylates may also be obtained by acylation of the free 7-methyl-9α-fluoro-11-ketotestosterone or free 1-dehydro-7-methyl-9α-fluoro-11-ketotestosterone with acyl halides or acid anhydride, preferably of hydrocarbon carboxylic acids containing from one to twelve carbon atoms, inclusive, and in the preferred embodiment in pyridine solution. This method is preferred for obtaining 7-methyl-9α-fluoro-11-ketotestosterone 17-acylates and 1-dehydro-7-methyl-9α-fluoro-11-ketotestosterone 17-acylates wherein the 17-acyloxy group is easily attacked by chromic acid such as in cases wherein an unsaturated acid, e.g., acrylic, crotonic, or similar acids are desired.

In the same manner as shown for the production of 7 - methyl - 9α - fluoro-11-ketotestosterone 17-acylates other 7 - methyl - 9α-halo-11-ketotestosterone 17-acylates and the corresponding 1-dehydro compounds are produced by either oxidizing the corresponding 7-methyl-9α-halo-11β-hydroxy-testosterone 17-acylate or corresponding 1-dehydro compound or by esterifying the 7-methyl-9α-halo - 11 - ketotestosterone or corresponding 1-dehydro compound wherein the halogen atom is chlorine, bromine, or iodine. In this manner, the acetates, butyrates, isobutyrates, valerates, isovalerates, hexanoates, heptanoates, octanoates, benzoates, phenylacetates, toluates, cinnamates, and other esters of 7-methyl-9α-chloro, 7-methyl- 9α-bromo and 7-methyl-9α-iodo-11-ketotestosterone, and the corresponding 1-dehydro compounds, are produced.

EXAMPLE 25

7-methyl-9α-fluoro-11-ketotestosterone

A solution of 0.5 gram of 7-methyl-9α-fluoro-11-ketotestosterone 17-propionate, eighty milligrams of potassium hydroxide in ten milliliters of ethanol and one milliliter of water was heated on the water bath for a period of one hour. Thereafter the mixture was poured in fifty milliliters of water and neutralized with dilute hydrochloric acid. The aqueous reaction mixture was thereupon extracted with three fifty-milliliter portions of methylene chloride, the methylene chloride solution was washed repeatedly with water, dried over anhydrous sodium sulfate and evaporated and the residues thus obtained recrystallized from acetone-Skellysolve B hexanes to give 7-methyl-9α-fluoro-11-ketotestosterone.

Using the procedure described in Example 25, but substituting 1-dehydro-7-methyl-9α-fluoro-11-ketotestosterone 17-propionate for 7-methyl-9α-fluoro-11-ketotestosterone 17-propionate, there is obtained 1-dehydro-7-methyl-9α-fluoro-11-ketotestosterone.

EXAMPLE 26

7-methyl-9α-fluoro-11β-hydroxytestosterone

A solution of one gram of 7-methyl-9α-fluoro-11β-hydroxytestosterone 17-acetate in methanol was freed of oxygen gas by bubbling nitrogen therethrough. A solution of one gram of potassium bicarbonate in ten milliliters of water was similarly freed of oxygen. The two solutions were mixed at a temperature of between eighteen and twenty degrees centigrade and in a nitrogen atmosphere. The mixture was stirred at room temperature for twenty hours while protecting it from atmospheric oxygen with nitrogen. At the end of twenty hours the solution was neutralized by the addition of ice water containing acetic acid. The neutralized solution was concentrated to about sixty milliliters by distillation at room temperature at reduced pressure and then chilled in a refrigerator for about sixteen hours. The thus-precipitated 7-methyl-9α-fluoro-11β-hydroxytestosterone was filtered, washed with water, dried and recrystallized to give 7-methyl-9α-fluoro-11β-hydroxytestosterone.

Using the procedure described in Example 26, but substituting 1-dehydro - 7 - methyl-9α-fluoro-11β-hydroxytestosterone 17-acetate for 7-methyl-9α-fluoro-11β-hydroxytestosterone 17-acetate, there is obtained 1-dehydro-7-methyl-9α-fluoro-11β-hydroxytestosterone.

EXAMPLE 27

7α-methyl-19-nortestosterone acetate

To 30 ml. of tetrahydrofuran (prepared by percolating commercial grade tetrahydrofuran through a column of neutral alumina and discarding the first 15 ml. of percolate) cooled in an ice-bath was added, with stirring under an atmosphere of nitrogen, 25 ml. of a 3 M solution of methylmagnesium bromide in ether followed of 0.4 g. of cuprous bromide. To the stirred mixture so obtained was added a slurry of a small amount of cuprous bromide in a solution of 3 g. of 6-dehydro-19-nortestosterone 17-acetate in 50 ml. of tetrahydrofuran (previously treated as described above). The resulting mixture was stirred with cooling for a further ten minutes and was then poured into a mixture of ice-diluted hydrochloric acid saturated with sodium chloride-ether which was purged with nitrogen. The ether phrase was separated and washed successively with brine, diluted sodium hydroxide-brine, and finally with brine. The ether extracts were combined and dried over anhydrous magnesium sulfate. The dried solution was filtered and the filtrate was evaporated to dryness. The residue was dissolved in 5 ml. of pyridine and 5 ml. of acetic anhydride. After standing at room temperature for 18 hrs., ice and water were added and the product was extracted with ether. The extract was washed with dilute acid, dilute sodium hydroxide and water, dried and the solvent removed. The residue was dissolved in methylene chloride and chromatographed on a column of magnesium silicate (Florisil). The column was eluted with Skellysolve B hexanes containing increasing proportions of acetone and those fractions, which were found by infrared analysis to contain the desired 7α-methyl-19-nortestosterone 17-acetate, were combined and evaporated to dryness. The oily residue was dissolved in acetone and chromatographed on a 30 g. 2:1 Celite: Darco column packed wet with acetone. The column was eluted with acetone and the first 750 ml. of eluate was evaporated to dryness. The residue was recrystallized from aqueous methanol. There was thus obtained 1 g. of 7α-methyl-19-nortestosterone 17-acetate in the form of a crystalline solid having a melting point of 111 to 114° C.; $[\alpha]_D$ +48° (chloroform). The ultraviolet absorption spectrum of this compound (in solution in ethanol) exhibited a maximum at 240 millimicrons ($\epsilon$=17,350).

*Analysis.*—Calcd. for $C_{21}H_{30}O_2$: C, 76.32; H, 9.15. Found: C, 76.28; H, 9.44.

EXAMPLE 28

7α-methyl-19-nortestosterone

A solution of 3 g. of 7α-methyl-19-nortestosterone-17-acetate in 40 ml. of a 5 percent solution of potassium carbonate in 80 percent aqueous methanol was heated under reflux in an atmosphere of nitrogen for 2 hours. The reaction mixture was extracted with ether and the ethereal extract was washed with water and dried over anhydrous magnesium sulfate. The dried ether solution was filtered and the filtrate was evaporated to dryness. The residue was triturated with ether and the solid which separated was isolated by filtration. There was thus obtained 7α-methyl-19-nortestosterone in the form of a crystalline solid having a melting point of 140 to 145.5° C. An analytical sample having a melting point of 145 to 146° C. and $[\alpha]_D$ +55° (chloroform) was obtained by recrystallization from a mixture of acetone and Skellysolve B (a mixture of hexanes). The ultraviolet absorption spectrum of this compound (in solution in ethanol) exhibited a maximum at 241 millimicrons ($\epsilon$=17,150).

*Analysis.*—Calcd. for $C_{19}H_{28}O_2$: C, 79.12; H, 9.78. Found: C, 79.13; H, 10.19.

EXAMPLE 29

7α-methyl-19-nor-Δ⁴-androstene-3,17-dione

To a slurry of 1.4 g. of chromium trioxide in 15 ml. of pyridine was added with stirring and cooling, a solution of 1.4 g. of 7α-methyl-19-nortestosterone in 15 ml. of pyridine. After the addition was complete, the reaction mixture was stirred at room temperature (approximately 20° C.) for 20 hours and was then diluted with a mixture of equal parts of benzene and ether. The resulting mixture was filtered through a bed of diatomaceous earth (Celite). The filter bed was washed well with a mixture of equal parts of ether and benzene, then with water and finally with the mixed solvent. The filtrate and the organic layer of the washings were combined and washed several times with water. Each aqueous washing was back-extracted with a mixture of equal parts of ether and benzene. The combined organic layers were then dried and evaporated to dryness. The residue was triturated with ether and the solid material was isolated by filtration. There was thus obtained 1.4 g. of 7α-methyl-19-nor-Δ⁴-androstene-3,17-dione in the form of a crystalline solid having a melting point of 195 to 198° C. An analytical sample having a melting point of 201 to 204° C. was obtained by recrystallization from acetone. The ultraviolet absorption spectrum of this compound (in solution in ethanol) exhibited a maximum of 239.5 millimicrons ($\epsilon$=17,000).

*Analysis.*—Calcd. for $C_{19}H_{26}O_2$: C, 79.69; H, 9.15. Found: C, 79.66; H, 8.87.

EXAMPLE 30

7α-methyl-19-nor-Δ⁴-androstene-3,17-dione 3-pyrrolidinyl enamine

To a solution of 10 mg. of 7α-methyl-19-nor-Δ⁴-androstene-3,17-dione in a little boiling methanol was added 1 drop of pyrrolidine. The resulting solution was concentrated by evaporation and allowed to cool. The crystalline solid which separated was isolated by filtration, washed with a small quantity of methanol and dried. There was thus obtained 7α-methyl-19-nor-Δ⁴-androstene-3,17-dione 3-pyrrolidinyl enamine in the form of a crystalline solid having a melting point of 151 to 160° C. The ultraviolet absorption spectrum of the compound (in solution in ether) exhibited a maximum at 282 millimicrons ($\epsilon$=23,450)

The infrared absorption spectrum of the compound (mineral oil mull) exhibited maxima at 1735, 1635, 1600, 1200, 1180, 1155 and 1035 reciprocal centimeters.

EXAMPLE 31

7α-methyl-17α-ethinyl-19-nortestosterone

A volume of 1 ml. of a 20 percent by weight suspension of sodium acetylide in xylene was centrifuged and the solid which separated was taken up in 6 ml. of redistilled dimethylsulfoxide. To the resulting mixture was added the 3-pyrrolidyl enamine from 0.5 g. of 7α-methyl-19-nor-Δ⁴-androstene-3,17-dione prepared as described in Example 30. The mixture so obtained was maintained under an atmosphere of nitrogen for five hours at the end of which time the excess sodium acetylide was destroyed by dropwise addition of water. About 2 ml. of water and 5 ml. of methanol was added to obtain a clear solution which was then heated on a steam bath for 1 hour. The mixture so obtained was extracted with ether and ethereal extract was washed successively with dilute hydrochloric acid, dilute sodium carbonate and water before being dried over anhydrous magnesium sulfate. The dried solution was filtered and the filtrate was evaporated to dryness. The residue was triturated with a mixture of ether and Skellysolve B and recrystallized twice from a mixture of acetone and Skellysolve B. There was thus obtained 0.161 g. of 7α-methyl-17α-ethinyl-19-nortestosterone in the form of a crystalline solid having a melting point of 197 to 199.5° C. The ultraviolet spectrum of the compound (in solution in ethanol) exhibited a maximum at 240.5 millimicrons. The infrared absorption spectrum of the compound (mineral oil mull) exhibited maxima at 3390, 3240, 2100, 1663 and 1623 reciprocal centimeters.

*Analysis.*—Calcd. for $C_{21}H_{28}O_2$: C, 80.72; H, 9.03. Found: C, 80.44; H, 9.05.

EXAMPLE 32

17α-ethyl-7α-methyl-19-nortestosterone

A suspension of 30 mg. of 1 percent palladium-on-charcoal catalyst in 20 milliliters of dioxane (purified as described by Fieser, Methods of Organic Chemistry, 2d Edition, p. 368) was saturated with hydrogen at atmospheric pressure. To the suspension was added 100 mg. of 7α-methyl-17α-ethinyl-19-nortestosterone and the mixture was hydrogenated at atmospheric pressure until 2 equivalents of hydrogen had been consumed. The reaction mixture was filtered through a bed of diatomaceous earth (Celite) and the filtrate was evaporated to dryness. The residue was combined with that obtained from a similar run employing 50 mg. of starting material. The combined residues were dissolved in methylene chloride and chromatographed on a column of 50 grams of magnesium silicate (Florisil) which had been packed wet with Skellysolve B. The column was eluted with Skellysolve B containing increasing proportions of acetone and those fractions, which, on the basis of infrared analysis, contained the desired 17α-ethyl-7α-methyl-19-nortestosterone, were combined and evaporated to dryness. The residue was recrystallized twice from a mixture of Skellysolve B and ether. There was thus obtained 17α-ethyl-7α-methyl-19-nortestosterone in the form of a crystalline solid having a melting point of 138 to 139° C. The ultraviolet spectrum of the compound (in solution in ethanol) exhibited a maximum of 241 millimicrons ($\epsilon$=17,000).

*Analysis.*—Calcd. for $C_{21}H_{32}O_2$: C, 79.69; H, 10.19. Found: C, 79.43; H, 10.23.

EXAMPLE 33

*7α,17α-dimethyl-19-nortestosterone*

A solution of 2.75 g. of 7α-methyl-19-nor-$\Delta^4$-androstene-3,17-dione 3-pyrrolidyl enamine in 70 ml. of tetrahydrofuran is added over a short period with stirring under an atmosphere of nitrogen to 25 ml. of a 3 M solution of methylmagnesium bromide in diethyl ether. The resulting mixture is distilled until the vapor temperature reaches 55° C. and the residue is then heated under reflux for approximately 4 hours. To the mixture so obtained is added carefully with stirring an iced ammonium chloride solution followed by 130 ml. of methanol and 25 ml. of 5% aqueous sodium hydroxide. The mixture is stirred at 40° C. under nitrogen for several hours and is concentrated to about one third volume under reduced pressure. The resulting mixture is diluted with water and extracted with ether. The ether extract is washed successively with water, dilute hydrochloric acid, dilute aqueous sodium carbonate, and water before being dried over anhydrous sodium sulfate and filtered. The filtrate is evaporated to dryness and the residue is dissolved in methylene chloride and chromatographed over 100 grams of magnesium silicate (Florisil). The column is eluted with Skellysolve B containing increasing proportions of acetone and those fractions of the eluate which on infrared absorption analysis show no C-17 carbonyl absorption are combined and evaporated to dryness. The residue is recrystallized from a mixture of acetone and Skellysolve B. There is thus obtained 7α,17α-dimethyl-19-nortestosterone in the form of a crystalline solid.

Using the above procedure but replacing methylmagnesium bromide by propylmagnesium bromide, isopropylmagnesium bromide, butylmagnesium bromide, allylmagnesium bromide, and 2-butenylmagnesium bromide, there are obtained 7α-methyl-17α-propyl-19-nortestosterone, 7α-methyl-17α-isopropyl-19-nortestosterone, 7α-methyl-17α-butyl-19-nortestosterone, 7α-methyl-17α-allyl-19-nortestosterone and 7α-methyl-17α-(α-methallyl)-19-nortestosterone, respectively.

EXAMPLE 34

*7α,17α-dimethyl-11α-hydroxy-19-nortestosterone*

A medium is prepared of 20 g. of cornsteep liquor (60% solids) and 10 g. of commercial dextrose, diluted to 1 liter and adjusted to a pH of 4.8 to 5.0. A volume of 10 l. of this sterilized medium is inoculated with a 24 hr. vegetative growth of culture *Rhizopus nigricans* (strain; ATCC 6227b) and incubated for 24 hrs. at a temperature of about 28° C. using a rate of aeration of 0.3 l. per minute and stirring at 300 r.p.m. After 24 hr. of agitation, a solution of 2 g. of 7α,17α-dimethyl-19-nortestosterone in 20 ml. of dimethylformamide is added to the inoculated medium. After an additional 72 hr. period of incubation, the fermentation liquor and mycelium are extracted with three 1 l. portions of methylene chloride. The extracts are combined and washed with aqueous sodium bicarbonate solution and then with water before being dried and evaporated to dryness. The residue is dissolved in methylene chloride and chromatographed over a column of synthetic magnesium silicate (Florisil). The column is eluted with Skellysolve B containing increasing proportions of acetone. Those fractions of the eluate which are found by weight profile and paper chromatogram analysis to contain the desired 7α,17α-dimethyl-11α-hydroxy-19-nortestosterone are combined and recrystallized from a mixture of acetone and Skellysolve B. There is thus obtained 7α,17α-dimethyl-11α-hydroxy-19-nortestosterone in the form of a crystalline solid.

Similarly, using the procedure described above, but replacing 7α,17α-dimethyl-19-nortestosterone by 17α-ethyl-7α-methyl-19-nortestosterone, 17α-ethinyl-7α-methyl-19-nortestosterone, 7α-methyl-17α-propyl-19-nortestosterone, 7α-methyl-17α-butyl-19-nortestosterone or 7α-methyl-17α-allyl-19-nortestosterone, there are obtained 17α-ethyl-7α-methyl-11α-hydroxy-19-nortestosterone, 17α-ethinyl-7α-methyl-11α-hydroxy-19-nortestosterone, 7α-methyl-17α-propyl-11α-hydroxy-19-nortestosterone, 7α-methyl-17α-butyl-11α-hydroxy-19-nortestosterone and 7α-methyl-17α-allyl-11α-hydroxy-19-nortestosterone, respectively.

EXAMPLE 35

*7α,17α-dimethyl-11β-hydroxy-19-nortestosterone*

A seed culture of *Cunninghamella blakesleeana* (ATCC 8688b), obtained from spores grown on a 2% agar, 5% malt extract solids at a pH of 6.0, is prepared by growth in a medium containing, per liter of tap water, 10 g. of dextrose (Cerelose) and 20 g. of liquid corn steep liquor (60% solids), adjusted to a pH of about 5 with 25% aqueous sodium hydroxide.

Five 1 l. portions of the above medium are inoculated with the seed culture and growth is continued with aeration and shaking for 48 hours. Then 0.2 g. of 7α,17α-dimethyl-19-nortestosterone in 30 ml. of alcohol is added to each flask and fermentation is conducted for another 48 hours. The mycelium is filtered from the beer and the beer is extracted four times with one-fourth by volume amounts of methylene chloride containing 25% by volume of ethyl acetate. The extracts are evaporated to dryness. The residue is redissolved in 150 ml. of methylene chloride and chromatographed on a column of magnesium silicate (Florisil) which is developed with hexanes containing increasing proportions of acetone. Those fractions of the eluate which are found by weight profile and paper chromatogram analysis to contain the desired 7α,17α-dimethyl-11β-hydroxy-19-nortestosterone are combined and recrystallized from a mixture of acetone and Skellysolve B. There is thus obtained 7α,17α-dimethyl-11β-hydroxy-19-nortestosterone in the form of a crystalline solid.

Similarly, using the procedure described above, but replacing 7α,17α-dimethyl-19-nortestosterone by 17α-ethyl-7α-methyl-19-nortestosterone, 17α-ethinyl-7α-methyl-19-nortestosterone, 7α-methyl-17α-propyl-19-nortestosterone, 7α-methyl-17α-butyl-19-nortestosterone, or 7α-methyl-17α-allyl-19-nortestosterone, there are obtained 17α-ethyl-7α-methyl-11β-hydroxy-19-nortestosterone, 17α-ethinyl-7α-methyl-11β-hydroxy-19-nortestosterone, 7α-methyl-17α-propyl-11β-hydroxy-19-nortestosterone, 7α-methyl-17α-butyl-11β-hydroxy-19-nortestosterone and 7α-methyl-17α-allyl-11β-hydroxy-19-nortestosterone, respectively.

EXAMPLE 36

*7α,17α-dimethyl-11-keto-19-nortestosterone*

A solution of 1.5 g. of 7α,17α-dimethyl-11α-hydroxy-19-nortestosterone in 80 ml. of acetic acid is treated with a solution of 0.74 g. of chromic acid anhydride in 4 ml. of water and 80 ml. of acetic acid and the mixture is allowed to stand at room temperature for 5 hr. The excess chromic acid is destroyed by the addition of 10 ml. of methanol and the resulting solution is concentrated in vacuo with heating on a water-bath. The residue is triturated with water and then extracted with ether. The ether solution is washed with dilute sodium hydroxide solution and water before being dried over anhydrous sodium sulfate. The dried ether solution is evaporated to dryness and the residue is recrystallized from aqueous acetone. There is thus obtained 7α,17α-dimethyl-11-keto-19-nortestosterone in the form of a crystalline solid.

The above compound is also obtained by employing 7α,17α-dimethyl-11β-hydroxy-19-nortestosterone as starting material in the above procedure.

Similarly, using the above procedure, but replacing 7α,17α-dimethyl-11α-hydroxy-19-nortestosterone by 7α,17α-dimethyl-11α-hydroxy-19-nortestosterone, 17α-ethyl-7α-methyl-11α-hydroxy-19-nortestosterone, 17α-ethinyl-7α-methyl-11α-hydroxy-19-nortestosterone, 7α-methyl-17α-propyl-11-hydroxy-19-nortestosterone, 7-methyl-17α-butyl-11α-hydroxy-19-nortestosterone, 7α-methyl-17α-allyl-11α-hydroxy-19-nortestosterone, or the corresponding 11β-epimers, there are obtained 7α-methyl-17α-allyl-11α-hydroxy-19-nortestosterone, 17α-ethinyl-7α-methyl-11-keto-19-nortestosterone, 7α-methyl-17α-propyl-11-keto-19-nortestosterone, 7α-methyl-17α-butyl-11-keto-19-nortestosterone, and 7α-methyl-17α-allyl-11-keto - 19 - nortestosterone, respectively.

EXAMPLE 37

*7α-methyl-11α-hydroxy-19-nor-Δ4-androstene-3,17-dione*

Using the procedure described in Example 34, but replacing 7α,17α-dimethyl-19-nortestosterone by 7α-methyl-19-nor-Δ4-androstene - 3,17 - done, there is obtained 7α-methyl-11α-hydroxy-19-nor-Δ4-androstene-3,17-dione.

EXAMPLE 38

*7α-methyl-11β-hydroxy-19-nor-Δ4-androstene-3,17-dione*

Using the procedure described in Example 35, but replacing 7α,17α-dimethyl-19-nortestosterone by 7α-methyl-19-nor-Δ4-androstene-3,17-dione, there is obtained 7α-methyl-11β-hydroxy-19-nor-Δ4-androstene-3,17-dione.

EXAMPLE 39

*7α-methyl-11β-hydroxy-19-nortestosterone*

Using the procedure described in Example 35, but replacing 7α,17α-dimethyl-19-nortestosterone by 7α-methyl-19-nortestosterone, there is obtained 7α-methyl-11β-hydroxy-19-nortestosterone.

EXAMPLE 40

*7α-methyl-11α-hydroxy-19-nortestosterone*

Using the procedure described in Example 34, but replacing 7α,17α-dimethyl-19-nortestosterone by 7α-methyl-19-nortestosterone, there is obtained 7α-methyl-11α-hydroxy-19-nortestosterone.

EXAMPLE 41

*7α-methyl-11β-hydroxy-19-nor-Δ4-androstene-3,17-dione*

A solution of 1.6 g. of 7α-methyl-11β-hydroxy-19-nortestosterone in a mixture of 35 ml. of toluene and 15 ml. of cyclohexanone is heated until about 10 ml. are distilled to dry the solution. To the dry solution so obtained is added 1.5 g. of aluminum tertiary butoxide and the resulting solution is refluxed until the reaction is complete. An excess of a saturated aqueous solution of sodium potassium tartrate is added and the solvents are then removed by steam distillation. The residue is extracted with methylene chloride and the methylene chloride extract is dried and chromatographed on a magnesium silicate (Florisil) column. The column is developed with Skellysolve B hexanes containing increasing proportions of acetone and those fractions which, by paper chromatogram analysis, are shown to contain the desired 7α-methyl-11β-hydroxy-19-nor-Δ4-androstene-3,17-dione, are recombined and evaporated to dryness. The residue is crystallized from aqueous acetone. There is thus obtained 7α-methyl-11β-hydroxy-19-nor-Δ4-androstene-3,17 - dione in the form of a cryestalline solid.

Using the above procedure, but replacing 7α-methyl-11β-hydroxy-19-nortestosterone by 7α - methyl - 11α - hydroxy-19-nortestosterone, there is obtained 7α-methyl-11α-hydroxy-19-nor-Δ4-androstene-3,17-dione.

EXAMPLE 42

*7α-methyl-11β-hydroxy-19-nor-Δ4-androstene-3,17-dione 3-pyrrolidinyl enamine*

Using the procedure described in Example 30, but replacing 7α-methyl-19-nor-Δ4-androstene-3,17-dione by 7α-methyl-11β-hydroxy-19-nor-Δ4 - androstene - 3,17 - dione, there is obtained the 3-pyrrolidinyl enamine of 7α-methyl-11β-hydroxy-19-nor-Δ4-androstene-3,17-dione.

Similarly, using the procedure of Example 30, but replacing 7α-methyl-19-nor-Δ4-androstene-3,17-dione by 7α-methyl-11α-hydroxy-19-nor-Δ4 - androstene - 3,17 - dione, there is obtained the 3-pyrrolidinyl enamine of 7α-methyl-11α-hydroxy-19-nor-Δ4-androstene-3,17-dione.

EXAMPLE 43

*7α-methyl-17α-ethinyl-11β-hydroxy-19-nortestosterone*

Using the procedure described in Example 31, but replacing the 3-pyrrolidyl enamine of 7α-methyl-19-nor-Δ4-androstene-3,17-dione by the 3-pyrrolidyl enamine of 7α-methyl-11β-hydroxy-19-nor-Δ4 - androstene - 3,17 - dione, there is obtained 7α-methyl-17α-ethinyl-11β-hydroxy-19-nortestosterone in the form of a crystalline solid.

Similarly, using the procedure of Example 31, but replacing the 3-pyrrolidyl enamine of 7α-methyl-19-nor-Δ4-androstene-3,17-dione by the 3-pyrrolidyl enamine of 7α-methyl-11α-hydroxy-19-nor-Δ4 - androstene - 3,17 - dione, there is obtained 7α-methyl-17α-ethinyl-11α-hydroxy-19-nortestosterone.

EXAMPLE 44

*7α,17α-dimethyl-11β-hydroxy-19-nortestoterone*

Using the procedure described in Example 33, but replacing the 3-pyrrolidyl enamine of 7α-methyl-19-nor-Δ4-androstene-3,17-dione by the 3-pyrrolidyl enamine of 7α-methyl-11β-hydroxy-19-nor - Δ4 - androstene - 3,17-dione, there is obtained 7α,17α,dimethyl-11β-hydroxy - 19 - nortestosterone in the form of a crystalline solid.

Similarly, using the procedure described in Example 33, but replacing the 3-pyrrolidyl enamine of 7α-methyl-19-nor-Δ4-androstene-3,17-dione by the 3-pyrrolidyl enamine of 7α-methyl-11α-hydroxy-19-nor-Δ4-androstene-3,17-dione, there is obtained 7α,17α-dimethyl-11α-hydroxy-19-nortestosterone in the form of a crystalline solid.

EXAMPLE 45

*7α-methyl-17α-ethinyl-19-nortestosterone 17-acetate*

A mixture of 1 g. of 7α - methyl - 17α-ethinyl-19-nortestoserone, 20 ml. of acetic anhydride and 1 ml. of pyridine is stirred and heated at 140° C. for 1 hour under a nitrogen atmosphere. The reaction mixture is then cooled to room temperature and stirred with 100 ml. of water for 2 hours. The product which separates is isolated by filtration. This product is a mixture of the desired 7α-methyl-17α-ethinyl-19-nortestosterone 17-acetate and the corresponding 3-enol 3,17-diacetate and the latter compound is hydrolyzed to the desired compound by heating the above product under reflux for 1 hr. with 100 ml. of methanol containing 2 ml. of concentrated hydrochloric acid. The reaction product so obtained is diluted with water and extracted with ether. The ether extract is dried over anhydrous magnesium sulfate and evaporated to dryness. The residue is dissolved in methylene chloride and chromatographed on a column of magnesium silicate (Florisil). The column is eluted with Skellysolve B containing increasing proportions of acetone and the fraction of the eluate, which is shown by paper chromatogram analysis to contain the desired product, is evaporated to dryness. The solid so obtained is recrystallized from aqueous methanol. There is thus obtained 7α-methyl-17α-ethinyl-19-nortestosterone 17-acetate in the form of a crystalline solid.

Similarly, by reacting 7α - methyl - 17α-ethinyl-19-nortestosterone with the appropriate hydrocarbon carboxylic acid anhydride, for example, at temperatures between about 80° C. and 150° C. using the above procedure there are produced other 17-acylates thereof such as the 17-propionate, 17-butyrate, 17-valerate, 17-hexanoate, 17-trimethylacetate, 17-isobutyrate, 17-isovalerate, 17-cyclohexanecarboxylate, 17-cyclopentylpropionate, 17-p-hexyloxypropionate, 17-benzoate, 17-hemisuccinate, 17-henylacetate, 17-acrylate, 17-crotonate, 17-undecylenate, 17-propiolate, 17-cinnamate, 17-maleate, and 17-citraconate.

Similarly, by reacting other 7α-methyl-19-nortestosterones and 7α-methyl-17α-(lower aliphatic hydrocarbon substituted)-19-nortestosterones with the appropriate hydrocarbon carboxylic acid anhydride using the above procedure there are obtained the corresponding 17-acylates such as 7α-methyl-19-nortestosterone 17-propionate,
11-keto-7α-methyl-19-nortestosterone 17-cyclopentylpropionate,
11α-butyroxy-7α-methyl-19-nortestosterone 17-butyrate,
7α,17α-dimethyl-19-nortestosterone 17-acetate,
7α-methyl-17α-ethyl-19-nortestosterone 17-propionate,
11-keto-7α-methyl-17α-ethinyl-19-nortestosterone 17-acetate,
7α-methyl-17α-propyl-19-nortestosterone 17-acetate,
7α-methyl-17α-isopropyl-19-nortestosterone 17-propionate,
7α-methyl-17α-butyl-19-nortestosterone 17-valerate,
7α-methyl-17α-(α-methallyl)-19-nortestosterone 17-acetate,
11α-acetoxy-7α-methyl-17α-isopropyl-19-nortestosterone 17-acetate,
11α-propionyloxy-7α-methyl-17α-ethyl-19-nortestosterone 17-propionate,
11α-acetoxy-7α-methyl-17α-allyl-19-nortestosterone 17-acetate,
11β-hydroxy-7α-methyl-17α-isopropyl-19-nortestosterone 17-propionate,
11β-hydroxy-7α-methyl-17α-isobutyl-19-nortestosterone 17-acetate, and
11β-hydroxy-7α-methyl-17α-allyl-19-nortestosterone 17-isobutyrate.

EXAMPLE 46

*7α-methyl-17α-ethyltestosterone*

A. 7α-methyl-Δ4-androstene-3,17-dione

To a solution of 20 g. of sodium dichromate dihydrate in 200 ml. of acetic acid was added 20 g. of 7α-methyltestosterone with stirring and cooling in a cold water bath. The reaction mixture was allowed to stand for several hours and was then poured into ca. 1 litre of water. The precipitate so formed was isolated by filtration, washed with water and dried. The material (18.7 g.; M.P. 186 to 191° C.) so obtained was recrystallized from a mixture of acetone and Skellysolve B. There was thus obtained 15.6 g. of 7α-methyl-Δ4-androstene-3,17-dione in the form of a crystalline solid having a melting point of 194 to 196° C.; $[\alpha]_D+196°$ (chloroform). The ultraviolet spectrum of the compound (in solution in ethanol) exhibited a maximum at 241 millimicrons ($\epsilon=17,250$).

*Analysis.*—Calcd. for $C_{20}H_{28}O_2$: C, 79.95; H, 9.39. Found: C, 79.81; H, 9.33.

B. 7α-methyl-17α-ethynyltestosterone

The 7α-methyl-Δ4-androstene-3,17-dione (15.6 g.) obtained as described above, was dissolved in the minimum amount of boiling methanol with nitrogen bubbling through and 10 ml. of pyrrolidine was added. The mixture was cooled and the solid which had separated was isolated by filtration, washed with fresh methanol and ether and dried for about 15 minutes at 60° C. There was thus obtained the 3-pyrrolidyl enamine of 7α-methyl-Δ4-androstene-3,17-dione in the form of a crystalline solid having a melting point of 199 to 205° C. with decomposition; $[\alpha]_D-190°$ (pyridine). The ultraviolet spectrum of the compound (in solution in ether) exhibited a maximum at 282 millimicrons ($\epsilon=29,900$).

*Analysis.*—Calcd. for $C_{24}H_{35}NO$: C, 81.53; H, 9.98; N, 3.95. Found: C, 81.57; H, 9.76; N, 3.77.

While the above enamine was being dried, 25 ml. of a suspension (0.2 g./ml.) of sodium acetylide in xylene was centrifuged. The solid so isolated was suspended in 160 mil. of redistilled dimethylsulfoxide. To this suspension was added a slurry of the whole of the above enamine in 100 ml. of dimethylsulfoxide. The reaction mixture was stirred under an atmosphere of nitrogen for 3 hrs. after which time 30 ml. of water and 50 ml. of methanol were added. The resulting mixture was heated to 50 to 60° C. for 1 hr. and was then stirred overnight at room temperature. The reaction mixture was then diluted with water and extracted with three 100 ml. portions of methylene chloride. The methylene chloride extracts were combined, washed with dilute hydrochloric acid and with water and then evaporated to dryness to give 2 g. of material. The aqueous washings from the above extraction were combined and made basic by the addition of sodium hydroxide solution. The solution so obtained was extracted several times with methylene chloride and the combined methylene chloride extracts were washed successively with dilute hydrochloric acid, dilute sodium carbonate and water before being dried over anhydrous sodium sulfate. The dried solution was filtered and the filtrate was evaporated to dryness. The residue (3.9 g.) was combined with the 2 g. of material obtained as described above and an acetone solution of the combined material was treated with a mixture of decolorizing charcoal (Darco), diatomaceous earth (Celite) and magnesium silicate (Florisil). The mixture was filtered and the filtrate was evaporated to dryness. The residue was recrystallized from a mixture of acetone and hexanes (Skellysolve B). There was thus obtained 3.9 g. of 7α-methyl-17α-ethynyltestosterone in the form of a crystalline solid having a melting point of 190 to 192.5° C. An analytical sample having a melting point of 191 to 193° C. and $[\alpha]_D+41°$ (chloroform) was prepared by recrystallization from ethyl acetate. The ultraviolet spectrum of the compound (in solution in ethanol) exhibited a maximum at 242 millimicrons ($\epsilon=16,550$).

*Analysis.*—Calcd. for $C_{22}H_{30}O_2$: C, 80.93; H, 9.26. Found: C, 80.86; H, 9.33.

C. 7α-methyl-17α-ethyltestosterone

A suspension of 0.2 g. of 1% palladium-on-charcoal catalyst in 40 ml. of dioxane was saturated with hydrogen at atmospheric pressure. To the suspension was added 1 g. of 7α-methyl-17α-ethynyltestosterone and the mixture was shaken in the presence of hydrogen until the theoretical quantity of hydrogen had been absorbed. The mixture was then filtered and the filtrate was evaporated to dryness under reduced pressure. The residue was recrystallized from a mixture of ether, methylene chloride, and Skellysolve B. There was thus obtained 0.8 g. of 7α-methyl-17α-ethyl-testosterone in the form of a crystalline solid having a melting point of 140.5 to 143° C. The ultraviolet spectrum of the compound (in solution in ethanol) exhibited a maximum at 242 millimicrons ($\epsilon=16,350$).

*Analysis.*—Calcd. for $C_{22}H_{34}O_2$: C, 79.95; H, 10.37. Found: C, 80.15; H, 10.39.

EXAMPLE 47

*7α-methyl-17α-ethyltestosterone 17-propionate*

To a solution of 5 g. of 7α-methyl-17α-ethyltestosterone in 20 ml. of pyridine is added 5 ml. of propionic anhydride. The resulting solution is refluxed under nitrogen until the hydroxyl absorption in the infrared region is gone before being diluted with crushed ice and water. The solid which separates is isolated by filtration and recrystallized from aqueous acetone. There is thus obtained 7α-methyl-17α-ethyltestosterone 17-propionate in the form of a crystalline solid.

Using the above procedure, but replacing propionic anhydride by the appropriate hydrocarbon carboxylic acid anhydride, there are obtained other 17-acylates of 7α-methyl-17α-ethyltestosterone such as the 17-acetate, 17-butyrate, 17-valerate, 17-hexanoate, 17-trimethylacetate-17-isobutyrate, 17-isovalerate, 17-cyclohexanecarboxylate, 17β-cyclopentylpropionate, 17-p-hexyloxyphenylpropionate, 17-benzoate, 17-hemisuccinate, 17-phenylacetate, 17-acrylate, 17-crotonate, 17-undecylenate, 17-propiolate, 17-cinnamate, 17-maleate, and 17-citraconate.

We claim:
1. A 7α-methyl-19-nortestosterone having the formula:

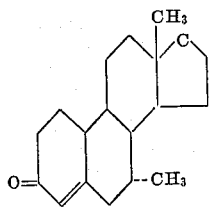

wherein C represents a group selected from the class consisting of

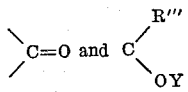

wherein R''' is selected from the class consisting of hydrogen and a lower aliphatic hydrocarbon radical containing from 1 to 4 carbon atoms, inclusive, and Y is selected from the class consisting of hydrogen and the acyl radical of a hydrocarbon carboxylic acid containing from 1 to 12 carbon atoms, inclusive.

2. 7α-methyl-19-nortestosterone acetate.
3. 7α-methyl-19-nortestosterone.
4. 7α-methyl-19-nor-Δ4-androstene-3,17-dione.
5. 7α,17α-dimethyl-19-nortestosterone.
6. 7α-methyl-17α-ethyl-19-nortestosterone.
7. 7α-methyl-17a-ethinyl-19-nortestosterone.
8. 7α-methyl-17α-ethinyl-19-nortestosterone 17-acetate.

References Cited

UNITED STATES PATENTS 2,793,218  5/1957  Herr _____ 260—397.45
2,837,464  6/1958  Nobile _____ 195—51
2,852,511  9/1958  Fried _____ 260—239.55

OTHER REFERENCES

Edwards et al., J.A.C.S. 81, pp. 3156–57 (1959).
Fieser et al., Steroids p. 565, Reinhold Pub. Co., New York, N.Y.

LEWIS GOTTS, *Primary Examiner.*

L. H. GASTON, M. LIEBMAN, *Examiners.*

H. A. FRENCH, *Assistant Examiner.*

UNITED STATES PATENT OFFICE
CERTIFICATE OF CORRECTION

Patent No. 3,341,557                September 12, 1967

John C. Babcock et al.

It is hereby certified that error appears in the above numbered patent requiring correction and that the said Letters Patent should read as corrected below.

Column 2, formula VI should appear as shown below instead of as in the patent:

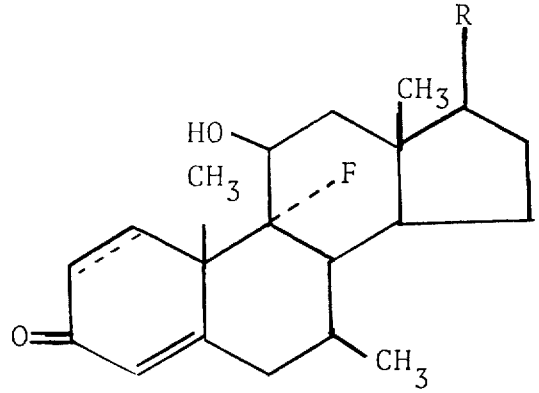

column 4, formula XVI should appear as shown below instead of as in the patent:

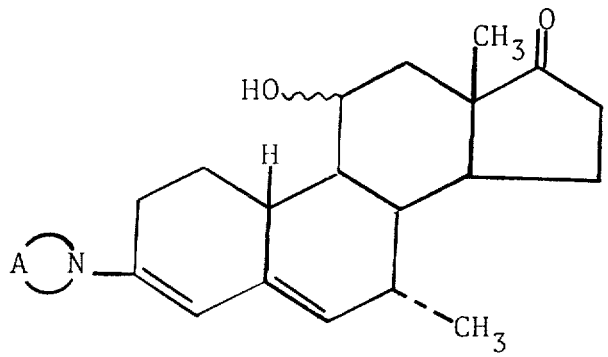

same column 4, line 67, for "actynoic" read -- octynoic --; column 5, line 1, for "6-heydro-9-nor-" read -- 6-dehydro-19-nor- --; lines 4 and 5, for "9-nortestosterone", each occurrence, read -- 19-nortestosterone --; column 31, line 3,341,557

(2)

41, for "7α-methyl-17α-allyl-11α-hydroxy-19-nortestosterone" read -- 17α-ethyl-7α-methyl-11-keto-19-nortestosterone --; column 33, line 8, for "henylacetate" read -- phenylacetate --.

Signed and sealed this 26th day of November 1968.

(SEAL)
Attest:

EDWARD M. FLETCHER, JR.
Attesting Officer

EDWARD J. BRENNER
Commissioner of Patents